(12) United States Patent
Okada et al.

(10) Patent No.: US 8,784,531 B2
(45) Date of Patent: Jul. 22, 2014

(54) GAS SEPARATION APPARATUS, MEMBRANE REACTOR, AND HYDROGEN PRODUCTION APPARATUS

(75) Inventors: Osamu Okada, Kyoto (JP); Masaaki Teramoto, Kyoto (JP); Eiji Kamio, Kyoto (JP); Nobuaki Hanai, Kyoto (JP); Yasato Kiyohara, Kyoto (JP)

(73) Assignee: Renaissance Energy Research Corporation, Kyoto (JP)

( * ) Notice: Subject to any disclaimer, the term of this patent is extended or adjusted under 35 U.S.C. 154(b) by 0 days.

(21) Appl. No.: 13/634,201

(22) PCT Filed: Dec. 26, 2011

(86) PCT No.: PCT/JP2011/080026
§ 371 (c)(1),
(2), (4) Date: Sep. 11, 2012

(87) PCT Pub. No.: WO2012/086836
PCT Pub. Date: Jun. 28, 2012

(65) Prior Publication Data
US 2013/0287678 A1    Oct. 31, 2013

(30) Foreign Application Priority Data
Dec. 24, 2010  (JP) ................. 2010-287262

(51) Int. Cl.
*B01D 53/22* (2006.01)
*C01B 3/38* (2006.01)
*H01M 8/06* (2006.01)
*C01B 3/48* (2006.01)
*C01B 3/50* (2006.01)
*B01D 69/08* (2006.01)
*H01M 8/04* (2006.01)

(52) U.S. Cl.
CPC .......... *B01D 53/22* (2013.01); *B01D 2319/06* (2013.01); *H01M 8/0687* (2013.01); *C01B 3/48* (2013.01); *C01B 3/503* (2013.01); *Y02E 60/50* (2013.01); *B01D 2257/504* (2013.01); *B01D 69/08* (2013.01); *C01B 2203/0475* (2013.01); *C01B 2203/0405* (2013.01); *H01M 8/0612* (2013.01); *B01D 2256/16* (2013.01); *H01M 8/04164* (2013.01); *B01D 2257/80* (2013.01); *Y02C 10/10* (2013.01); *C01B 2203/0495* (2013.01); *H01M 8/0668* (2013.01); *C01B 2203/0283* (2013.01); *C01B 2203/148* (2013.01); *C01B 2203/1241* (2013.01); *C01B 3/38* (2013.01); *C01B 2203/0233* (2013.01); *H01M 8/04149* (2013.01)
USPC .......... 95/45; 95/51; 95/52; 96/4; 96/8; 96/9; 423/651; 423/652; 422/162

(58) Field of Classification Search
CPC ...... B01D 53/22; B01D 53/226; B01D 69/08; B01D 2317/025; B01D 2317/08; B01D 2256/16; B01D 2256/245; B01D 2257/504; B01D 2257/80; B01D 2319/06; B01D 2319/025; Y02C 10/10
USPC ............ 96/4, 7, 8, 9; 95/45, 51, 52; 423/651, 423/652; 422/162
See application file for complete search history.

(56) References Cited

U.S. PATENT DOCUMENTS

| | | | | | |
|---|---|---|---|---|---|
| 4,931,070 | A | * | 6/1990 | Prasad | 95/52 |
| 5,071,451 | A | * | 12/1991 | Wijmans | 95/52 |
| 5,383,957 | A | * | 1/1995 | Barbe et al. | 96/9 |
| 5,401,300 | A | * | 3/1995 | Lokhandwala et al. | 95/51 |
| 5,407,467 | A | * | 4/1995 | Lokhandwala et al. | 95/51 |
| 6,059,857 | A | * | 5/2000 | Ray et al. | 95/52 |
| 6,096,114 | A | * | 8/2000 | Li et al. | 95/51 |
| 6,579,331 | B1 | | 6/2003 | Ho | |
| 8,388,743 | B2 | * | 3/2013 | Suzuki et al. | 96/4 |
| 8,435,326 | B2 | * | 5/2013 | Schmit et al. | 95/51 |
| 2002/0152889 | A1 | * | 10/2002 | Baker et al. | 95/45 |
| 2007/0186768 | A1 | * | 8/2007 | Coors | 95/52 |
| 2010/0260657 | A1 | * | 10/2010 | Niitsuma et al. | 423/437.1 |
| 2011/0300065 | A1 | * | 12/2011 | Nakanishi et al. | 96/6 |
| 2012/0118147 | A1 | * | 5/2012 | Claridge et al. | 95/52 |

1

FOREIGN PATENT DOCUMENTS

JP   2009195900 A   9/2009
JP   2010036123 A   2/2010

* cited by examiner

*Primary Examiner* — Jason M Greene
(74) *Attorney, Agent, or Firm* — Haynes Beffel & Wolfeld LLP

(57) ABSTRACT

In a gas separation apparatus that separates carbon dioxide and water vapor from a first mixture gas containing a predetermined major component gas, carbon dioxide, and water vapor, the energy utilization efficiency thereof is improved. Also, by utilizing the function of this gas separation apparatus, a membrane reactor and a hydrogen production apparatus exhibiting high energy utilization efficiency are provided. The gas separation apparatus is constructed to include a first separation membrane 33 and a second separation membrane 34 that are made of different materials. When the first mixture gas is supplied at a temperature of 100° C. or higher, the first separation membrane 33 separates a second mixture gas containing carbon dioxide and water vapor that permeate through the first separation membrane by allowing carbon dioxide and water vapor to permeate selectively. When the second mixture gas is supplied, the second separation membrane 34 separates water vapor that permeates through the second separation membrane 34 by allowing water vapor to permeate selectively.

14 Claims, 21 Drawing Sheets

GAS SEPARATION APPARATUS, MEMBRANE REACTOR, AND HYDROGEN PRODUCTION APPARATUS

CROSS-REFERENCE TO RELATED APPLICATIONS

This application is a National Phase filing under 35 U.S.C. §371 of International Application No. PCT/JP2011/080026 filed on Dec. 26, 2011, and which claims priority to Japanese Patent Application No. 2010-287262 filed on Dec. 24, 2010.

TECHNICAL FIELD

The present invention relates to a gas separation apparatus and a gas separation method that separate carbon dioxide and water vapor from a mixture gas containing at least carbon dioxide and water vapor as major component gases. The present invention also relates to a membrane reactor utilizing a gas separation function of the gas separation apparatus as well as to a hydrogen production apparatus including this membrane reactor and this hydrogen production method.

BACKGROUND ART

In a current reforming system for a hydrogen station, hydrocarbon is reformed to hydrogen and carbon monoxide (CO) by a water vapor reforming reaction represented by the following chemical formula 1, and further, hydrogen is produced by allowing carbon monoxide and water vapor to react using a CO shift reaction.

$$CH_4 + H_2O \Leftrightarrow CO + 3H_2 \quad \text{Chemical formula 1}$$

In a conventional CO shifter, as a cause that inhibits scale reduction and shortening of the starting time, need for a large amount of a CO shift catalyst due to restriction of the CO shift reaction represented by the following chemical formula 2 on the chemical equilibrium can be mentioned. As one example, in a reforming system for PAFC (phosphoric acid type fuel cell) of 50 kW, 20 L of the reforming catalyst is needed, whereas 77 L of the CO shift catalyst, which is about four times as large, is needed. This is a large factor that inhibits scale reduction of the CO shifter and shortening of the starting time. Here, the symbol "$\Leftrightarrow$" denotes a reversible reaction.

$$CO + H_2O \Leftrightarrow CO_2 + H_2 \quad \text{Chemical formula 2}$$

Thus, by providing a $CO_2$ facilitated transport membrane that allows carbon dioxide to permeate selectively in the CO shifter and efficiently removing carbon dioxide on the right side that has been produced by the CO shift reaction of the above chemical formula 2 to the outside of the CO shifter, the chemical equilibrium can be shifted to the hydrogen production side (right side), whereby a high conversion ratio can be obtained at the same reaction temperature and, as a result of this, carbon monoxide and carbon dioxide can be removed beyond the limitation imposed by the restriction of the equilibrium.

FIG. 20 is a conceptual block diagram of a hydrogen production apparatus including a CO shifting section provided with a $CO_2$ facilitated transport membrane. A reformer 31 receives supply of $CH_4$ and $H_2O$ and generates a water vapor reforming reaction represented by the above chemical formula 1. A membrane reactor 30 receives supply of a mixture gas containing $H_2$ and $CO_2$ that have been produced in the water vapor reformer 31 and residual $H_2O$, and generates a shift reaction represented by the above chemical formula 2 in a shift treatment section 32. Here, the membrane reactor 30 is provided with a $CO_2$ facilitated transport membrane 33 that allows $CO_2$ to permeate selectively. By this, $CO_2$ produced by the chemical formula 2 permeates through the membrane 33 to be discharged to the outside together with an inert sweep gas (for example, Ar gas). Also, by this, by recovering a gas that has not permeated through the membrane 33 from the shift treatment section 32, $H_2$ gas having a small content of $CO_2$ and a small content of CO can be obtained.

FIG. 21 shows concentration change of each of carbon monoxide (A) and carbon dioxide (B) along the catalyst layer length of the CO shifter when provided with the $CO_2$ facilitated transport membrane and when not provided with the $CO_2$ facilitated transport membrane.

By the CO shifter provided with the $CO_2$ facilitated transport membrane ($CO_2$ permeation type membrane reactor), carbon monoxide and carbon dioxide can be removed beyond the limitation imposed by the restriction of the equilibrium. This can achieve reduction of the load of PSA and S/C in the hydrogen station, so that the cost reduction and higher efficiency of the whole hydrogen station can be achieved. Also, by incorporating a $CO_2$ facilitated transport membrane in a shifter, increase in the rate of the CO shift reaction (higher SV) can be achieved, so that the scale reduction of the reforming system and the shortening of the starting time can be achieved. For example, as a prior example of such a $CO_2$ permeation type membrane reactor, there is one disclosed in the following Patent Document 1 (or Patent Document 2 with the same contents by the same inventor).

PRIOR ART DOCUMENTS

Patent Documents

Patent Document 1: Japanese Patent Application Laid-open No. 2001-511430
Patent Document 2: U.S. Pat. No. 6,579,331

DISCLOSURE OF THE INVENTION

Problems to be Solved by the Invention

In order to exhibit the function (membrane function) of facilitated transport of carbon dioxide sufficiently, the $CO_2$ facilitated transport membrane needs moisture. More specifically, the reaction of carbon dioxide ($CO_2$) and carbonate ions within the membrane typically shows a chemical reaction represented by the following reaction pathway formula (chemical formula 3). By this, it will be understood that, according as the moisture within the membrane increases in amount, the chemical equilibrium is shifted to the product side (right side) more, whereby the permeation of carbon dioxide is facilitated.

$$CO_2 + CO_3^{2-} + H_2O \rightarrow 2HCO_3^- \quad \text{Chemical formula 3}$$

On the other hand, the performance of the CO shift catalyst supplied to the CO shift reaction tends to decrease with decreasing temperature, so that, in order to generate the CO shift reaction at high efficiency, it is requested that the catalyst temperature is raised to 100° C. or higher. However, when the inside of the membrane reactor 30 has a high temperature exceeding 100° C., the moisture within the $CO_2$ facilitated transport membrane 33 will evaporate, and the membrane function, that is, the function of facilitated transport of carbon dioxide, will deteriorate. The deterioration in the membrane function is a common sense of the facilitated transport membrane up till now. On the other hand, according as the temperature rises, the rate of the above chemical reaction increases. Therefore, the inventor of the present application has confirmed that the membrane function can be exhibited sufficiently by ensuring the moisture amount within the membrane by increasing the water vapor partial pressure within the gaseous phase under a pressurized condition.

However, when the membrane reactor 30 is set under a temperature condition of 100° C. or higher, part of water vapor permeates through the $CO_2$ facilitated transport membrane 33 in addition to $CO_2$. Although $H_2O$ having permeated through the membrane 33 has latent heat, this latent heat has not been effectively utilized up till now.

An object of the present invention is to improve the energy utilization efficiency particularly in a gas separation apparatus that separates carbon dioxide and water vapor from a mixture gas containing a predetermined major component gas, carbon dioxide, and water vapor. Another object of the present invention is to provide a membrane reactor and a hydrogen production apparatus exhibiting high energy utilization efficiency by utilizing the function of this gas separation apparatus. Still another object of the present invention is to provide a gas separation method and a hydrogen production method that each of the above apparatuses utilizes.

Means for Solving the Problems

In order to achieve the above-described objects, the gas separation apparatus according to the present invention is a gas separation apparatus that separates carbon dioxide and water vapor individually from a first mixture gas containing a predetermined major component gas and at least carbon dioxide and water vapor, including a first separation membrane and a second separation membrane that are made of different materials, wherein when the first mixture gas is supplied to the first separation membrane, it separates a second mixture gas containing carbon dioxide and water vapor from the first mixture gas by allowing carbon dioxide and water vapor contained in the first mixture gas to permeate selectively and, when the second mixture gas is supplied to the second separation membrane, it separates water vapor from the second mixture gas by allowing water vapor contained in the second mixture gas to permeate selectively.

Also, in addition to the above characteristic feature, the gas separation apparatus has another characteristic feature such that, when the first mixture gas is supplied at 100° C. or higher, the first separation membrane separates the second mixture gas containing carbon dioxide and water vapor from the first mixture gas by allowing carbon dioxide and water vapor contained in the first mixture gas to permeate selectively.

The gas separation apparatus having each of the above characteristic features may be further constructed in such a manner that the water vapor that has permeated through the second separation membrane is re-utilized by being supplied to a stage before the second separation membrane.

Also, the first separation membrane and the second separation membrane may be placed in an identical box body.

Further, at this time, the first separation membrane and the second separation membrane may be formed to have coaxial cylindrical shapes.

Also, the first separation membrane may be a $CO_2$ facilitated transport membrane having a $CO_2/H_2$ selective separation performance under a temperature condition of 100° C. or higher, and may be made such that a gel layer is carried on a hydrophilic porous membrane having a heat resistance of 100° C. or higher, the gel layer including an additive made of cesium carbonate, cesium bicarbonate or cesium hydroxide within a hydrogel membrane.

Also, the first separation membrane may be a $CO_2$ facilitated transport membrane having a $CO_2/H_2$ selective separation performance under a temperature condition of 100° C. or higher, and may be made such that a gel layer is carried on a hydrophilic porous membrane having a heat resistance of 100° C. or higher, the gel layer including an additive made of rubidium carbonate, rubidium bicarbonate or rubidium hydroxide within a hydrogel membrane.

Also, as a hydrogel membrane, a polyvinyl alcohol-polyacrylic acid salt copolymer gel membrane may be adopted. Here, by those skilled in the art, the polyvinyl alcohol-polyacrylic acid salt copolymer may be referred to as a polyvinyl alcohol-polyacrylic acid copolymer. Here, the hydrogel is a three-dimensional network structure formed by cross-linking a hydrophilic polymer, and has a property of being swollen by absorbing water.

Also, the membrane reactor according to the present invention is a membrane reactor that carries out a CO shift treatment on a gas to be shifted containing carbon monoxide and water vapor, including a first treatment section having a first separation membrane formed on at least a part of an outer circumferential surface of an occupied space thereof, the inside of the first treatment section being filled with a CO shift catalyst; and a second treatment section having a second separation membrane formed on at least a part of an outer circumferential surface of an occupied space thereof, the second separation membrane being made of a material different from that of the first separation membrane, wherein the first treatment section produces a first mixture gas containing hydrogen, carbon dioxide, and water vapor by performing a shift treatment on the gas to be shifted with use of the CO shift catalyst under a temperature condition of 100° C. or higher, and allows carbon dioxide and water vapor contained in the first mixture gas to permeate selectively through the first separation membrane, and the second treatment section receives supply of a second mixture gas containing carbon dioxide and water vapor that have permeated through the first separation membrane, and allows water vapor contained in the second mixture gas to permeate selectively through the second separation membrane.

In this membrane reactor, the first treatment section and the second treatment section may be placed in an identical box body.

Further, in this membrane reactor, the first treatment section and the second treatment section may be formed to have coaxial cylindrical shapes.

Also, in this membrane reactor, the first separation membrane provided in the first treatment section may be a $CO_2$ facilitated transport membrane having a $CO_2/H_2$ selective separation performance under a temperature condition of 100° C. or higher, and may be made such that a gel layer is carried on a hydrophilic porous membrane having a heat resistance of 100° C. or higher, the gel layer including an additive made of cesium carbonate, cesium bicarbonate or cesium hydroxide within a hydrogel membrane.

Also, in this membrane reactor, the first separation membrane provided in the first treatment section may be a $CO_2$ facilitated transport membrane having a $CO_2/H_2$ selective separation performance under a temperature condition of 100° C. or higher, and may be made such that a gel layer is carried on a hydrophilic porous membrane having a heat resistance of 100° C. or higher, the gel layer including an additive made of rubidium carbonate, rubidium bicarbonate or rubidium hydroxide within a hydrogel membrane.

The hydrogen production apparatus according to the present invention is a hydrogen production apparatus including a membrane reactor having the above-described characteristic feature and a reformer whose inside is filled with a reforming catalyst, wherein an object gas containing hydrogen as a major component that does not permeate through the first separation membrane within the first treatment section is outputted from the first treatment section, the reformer is constructed to receive supply of a gas to be reformed containing hydrocarbon and water vapor, to produce the gas to be shifted by performing a reforming treatment on the gas to be reformed with use of the reforming catalyst, and to output the gas to be shifted to the first treatment section, and water vapor that has permeated through the second separation membrane in the second treatment section flows into the reformer or at least one of an upstream side and a downstream side of the first separation membrane of the first treatment section.

Also, in addition to the above characteristic feature, the hydrogen production apparatus may include a third treatment section having a third separation membrane having a material identical to that of the second separation membrane, wherein the third treatment section may be constructed to separate water vapor from the first mixture gas by allowing water vapor contained in a residual gas of the first mixture gas that has not permeated through the first separation membrane in the first treatment section to permeate selectively, and water vapor that has permeated through the third separation membrane in the third treatment section may flow into the reformer or at least one of the upstream side and the downstream side of the first separation membrane of the first treatment section.

Also, the gas separation method according to the present invention is a gas separation method that separates carbon dioxide and water vapor individually from a first mixture gas containing a predetermined major component gas and at least carbon dioxide and water vapor, the gas separation method including supplying the first mixture gas to be brought into contact with a surface of a first separation membrane so as to separate a second mixture gas containing carbon dioxide and water vapor from the first mixture gas by allowing carbon dioxide and water vapor contained in the first mixture gas to permeate selectively through the first separation membrane; and supplying the second mixture gas to be brought into contact with a surface of a second separation membrane made of a material different from that of the first separation membrane so as to separate water vapor from the second mixture gas by allowing water vapor contained in the second mixture gas to permeate selectively through the second separation membrane.

In addition to the above characteristic feature, the gas separation method according to the present invention has another characteristic feature of supplying the first mixture gas to be brought into contact with the surface of the first separation membrane at a temperature of 100° C. or higher so as to separate the second mixture gas containing carbon dioxide and water vapor from the first mixture gas by allowing carbon dioxide and water vapor contained in the first mixture gas to permeate selectively through the first separation membrane.

Also, a hydrogen production method according to the present invention includes a reforming step of receiving supply of a gas to be reformed containing hydrocarbon and water vapor and producing a gas to be shifted containing carbon monoxide, hydrogen, and water vapor by performing a reforming treatment on the gas to be reformed with use of a reforming catalyst; a shifting step of receiving supply of the gas to be shifted and producing a first mixture gas containing hydrogen, carbon dioxide, and water vapor by performing a CO shift treatment on the gas to be shifted with use of a shift catalyst under a temperature condition of 100° C. or higher; a first separation step of supplying the first mixture gas to be brought into contact with a surface of a first separation membrane so as to separate a second mixture gas containing carbon dioxide and water vapor that permeate through the first separation membrane from the first mixture gas by allowing carbon dioxide and water vapor contained in the first mixture gas to permeate selectively through the first separation membrane and to recover an object gas containing hydrogen that does not permeate through the first separation membrane as a major component; and a second separation step of supplying the second mixture gas to be brought into contact with a surface of a second separation membrane made of a material different from that of the first separation membrane so as to separate water vapor that permeates through the second separation membrane from the second mixture gas by allowing water vapor contained in the second mixture gas to permeate selectively through the second separation membrane, wherein the shifting step and the first separation step are carried out in parallel within an identical treatment mechanism, and at least part of water vapor recovered in the second separation step is utilized for reaction in the shifting step.

Effect of the Invention

According to the construction of the gas separation apparatus of the present invention, water vapor can be separated from a mixture gas containing carbon dioxide and water vapor. Therefore, by recovering this water vapor, the water vapor having latent heat can be re-utilized, so that the energy efficiency of the whole system can be improved.

MODES FOR CARRYING OUT THE INVENTION

Hereafter, embodiments of the present invention will be described in detail.

Figure 1:
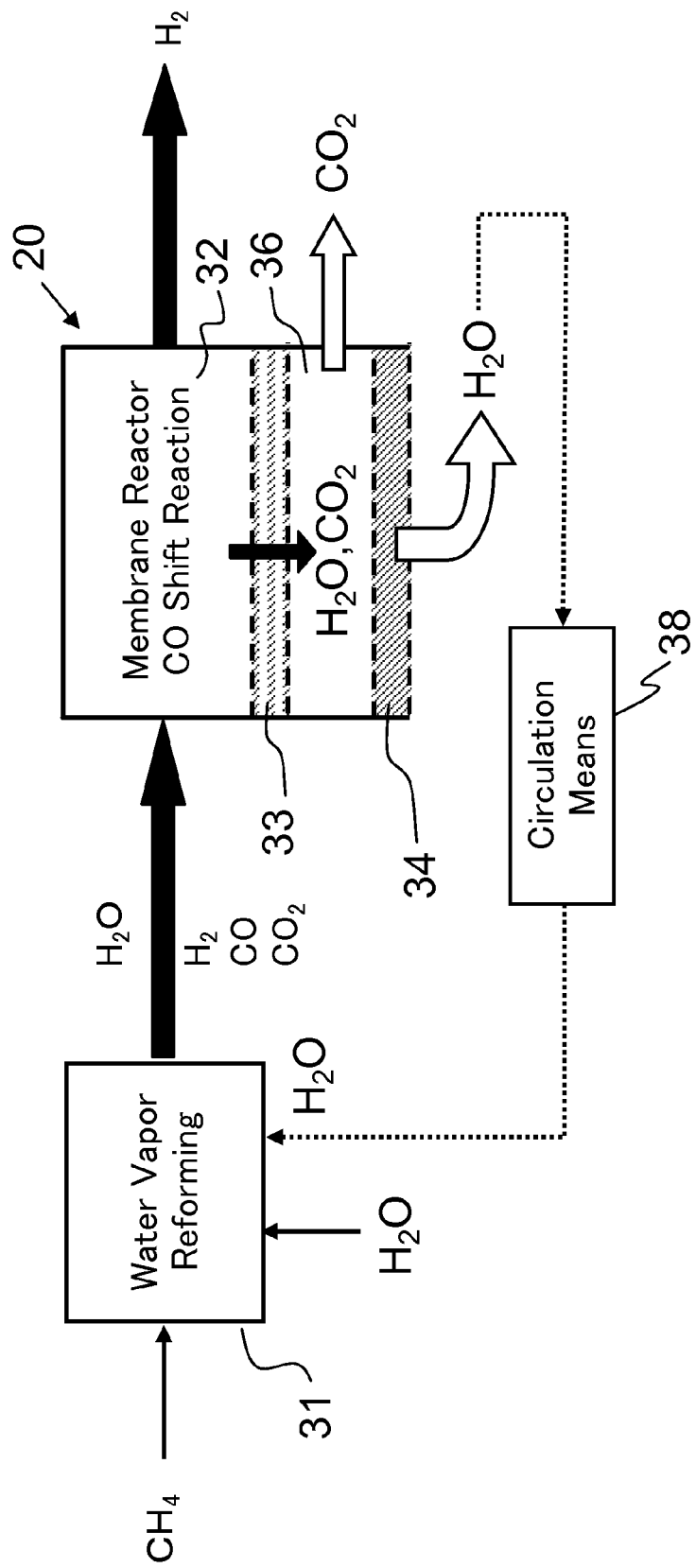
FIG. 1 is a conceptual block diagram of a hydrogen production apparatus according to the present invention.

FIG. 1 is a conceptual block diagram of a hydrogen production apparatus 1 according to the present invention. FIG. 1 includes a reformer 31 that performs a water vapor reforming treatment and a membrane reactor 20 that performs a CO shift treatment. The membrane reactor 20 includes a first treatment section 32 having a first separation membrane 33 formed on at least a part of an outer circumferential surface of an occupied space thereof, the inside of the first treatment section 32 being filled with a CO shift catalyst, and a second treatment section 36 having a second separation membrane 34 formed on at least a part of an outer circumferential surface of an occupied space thereof, the second separation membrane 34 being made of a material different from that of the first separation membrane 33. The membrane reactor 20 also includes circulation means 38 for circulating the water vapor that has permeated through the second separation membrane 34 to the reformer 31.

Here, the chemical formulas shown in FIG. 1 conceptually represent major components contained in the gas that flows in the direction of the arrow symbol within FIG. 1. The same applies to each of the following drawings.

The reformer 31 receives supply of water vapor and a gas to be reformed containing hydrocarbon such as methane ($CH_4$). The reformer 31 is filled with a reforming catalyst such as ruthenium, nickel, or platinum. By a catalytic action of this reforming catalyst, water vapor and methane gas contained in the gas to be reformed are subjected to a reforming reaction by the reaction formula represented by the above chemical formula 1 under a temperature condition of, for example, about 700° C., so as to be converted to a gas to be shifted containing hydrogen gas and carbon monoxide gas. Then, this gas to be shifted is supplied to the first treatment section 32 of the membrane reactor 20.

The inside of the first treatment section 32 of the membrane reactor 20 is filled with a CO shift catalyst constituted of, for example, a Cu—Zn-based catalyst. By the catalytic action of this CO shift catalyst, the first treatment section 32 allows the carbon monoxide gas contained in the gas to be shifted to undergo a shift reaction by the reaction formula represented by the above chemical formula 2 under a temperature condition of about 160° C., so as to covert the gas to be shifted to carbon dioxide gas and hydrogen gas.

Also, as described above, in the first treatment section 32, the first separation membrane 33 is formed on at least a part of the outer circumferential surface of the occupied space. This first separation membrane 33 has a function of allowing carbon dioxide and water vapor to permeate selectively therethrough. A detailed construction of the first separation membrane 33 will be described later.

In the first treatment section 32, part of the water vapor contained in the gas to be shifted is mixedly present as a residue in addition to the carbon dioxide gas and the hydrogen gas produced by the shift treatment. Also, as will be described later, the first separation membrane 33 has a construction of having moisture in the inside thereof, and the shift treatment is carried out under a temperature condition of about 160° C., so that water vapor is produced also by evaporation of part of the water contained in the first separation membrane 33. Hereafter, this mixture gas containing carbon dioxide gas, hydrogen gas, and water vapor gas will be referred to as a "first mixture gas".

As described above, the first separation membrane 33 has a function of allowing carbon dioxide and water vapor to permeate selectively therethrough. For this reason, out of the first mixture gas that is present in the first treatment section 32, the carbon dioxide and the water vapor that are mixedly present in the gas permeate through the first separation membrane 33 to be sent into the second treatment section 36. On the other hand, the hydrogen gas does not permeate through the first separation membrane 33. Hereafter, the mixture gas that permeates through the first separation membrane 33 to be sent to the second treatment section 36 will be referred to as a "second mixture gas". As described above, the second mixture gas contains carbon dioxide and water vapor as major components.

In the second treatment section 36, the second separation membrane 34 is formed on at least a part of the outer circumferential surface of the occupied space. This second separation membrane 34 has a function of allowing water vapor to permeate selectively therethrough. A detailed construction of the second separation membrane 34 will be described later.

The second separation membrane 34 has a function of allowing water vapor to permeate selectively therethrough, so that, out of the second mixture gas that is present in the second treatment section, the water vapor permeates through the second separation membrane 34 to be discharged to the outside. On the other hand, the carbon dioxide gas does not permeate through the second separation membrane 34.

Therefore, by taking the gas that stays within the first treatment section 32 out to the outside, an object gas containing hydrogen gas as a major component can be obtained. Also, by taking the gas that stays within the second treatment section 36 out to the outside, a gas containing carbon dioxide as a major component can be obtained. This gas can be made to flow out from the second treatment section 36 to the outside by suction with a pump or the like. Also, when there is no plan of reutilizing this gas as carbon dioxide gas, this gas can be made to flow out to the outside by letting a sweep gas SG constituted of an inert gas such as Ar flow into the second treatment section 36.

Here, the first treatment section 32 is placed under a temperature condition of about 160° C. as described above, so that the second mixture gas supplied into the second treatment section 36 also exhibits a temperature state of 100° C. or higher. In other words, the water vapor that permeates through the second separation membrane 34 also shows a temperature of 100° C. or higher. Further, since this water vapor is separated from carbon dioxide by the second separation membrane 34, this water vapor can be re-utilized as water vapor steam having latent heat. As one example of re-utilization of this water vapor, FIG. 1 shows a construction in which the water vapor is supplied into the reformer 31 via the circulation means 38.

Figure 20:
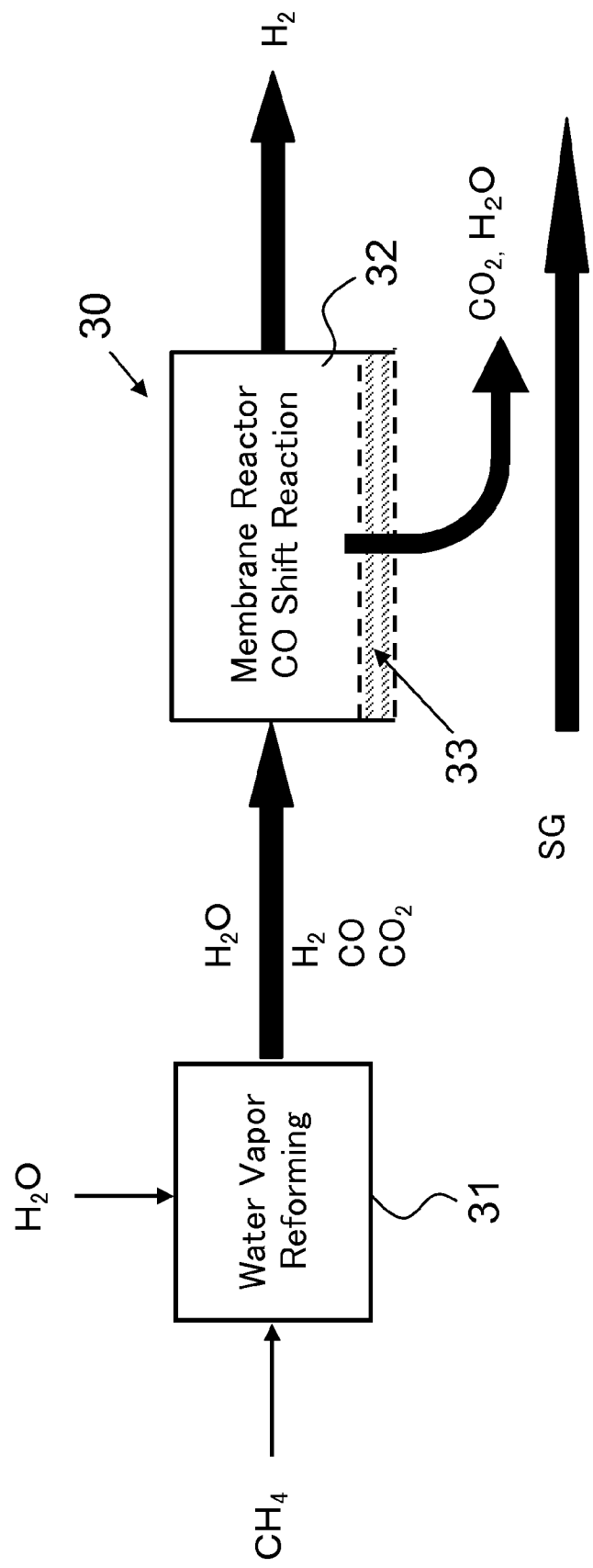
FIG. 20 is a conceptual block diagram of a hydrogen production apparatus including a CO shifter equipped with a $CO_2$ facilitated transport membrane.
Figure 21A:
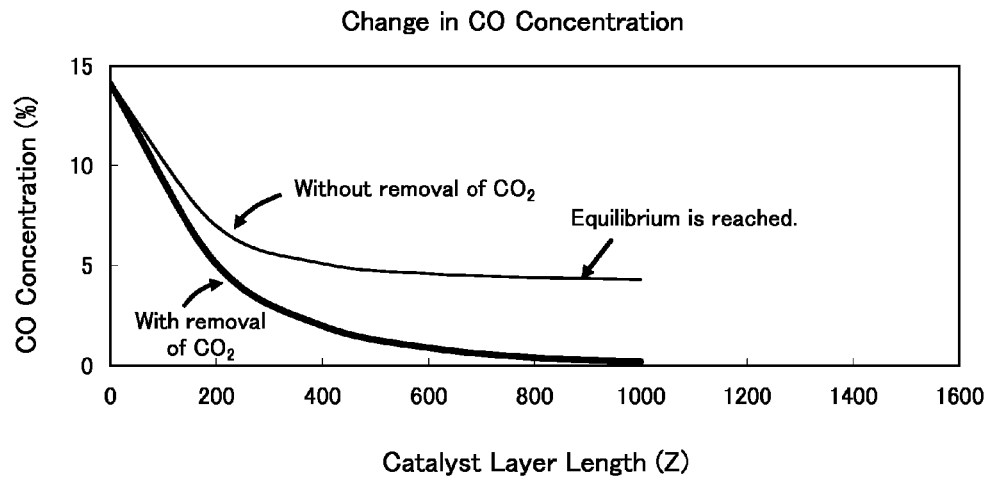
FIG. 21 is a comparison graph of the concentration change of each of carbon monoxide and carbon dioxide along the catalyst layer length of the CO shifter when the CO shifter is equipped with the $CO_2$ facilitated transport membrane and when the CO shifter is not equipped with the $CO_2$ facilitated transport membrane.
Figure 21B:
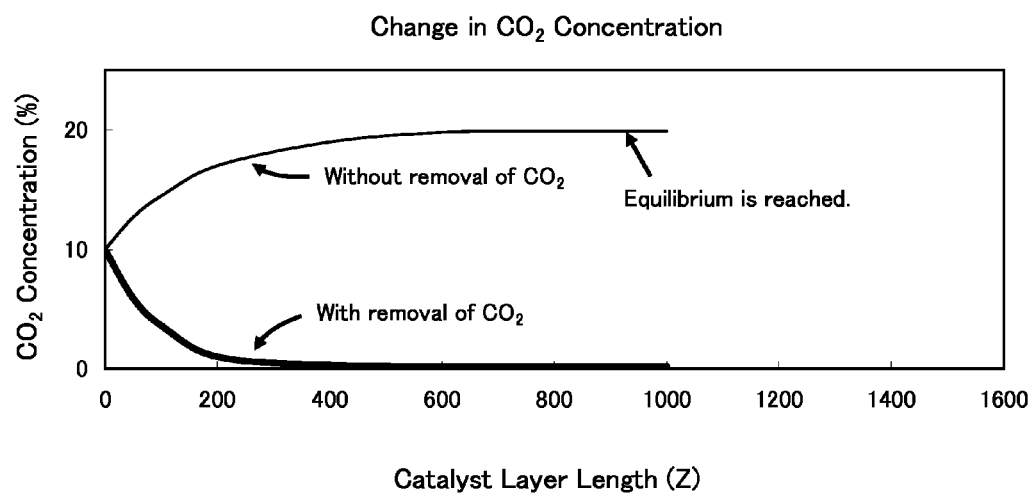

The reformer 31 needs water vapor for reaction therein. When water vapor is produced from the state of water and supplied to the reformer 31, energy for producing water vapor will be needed. In contrast, with the construction of FIG. 1, the water vapor is already produced, so that the energy efficiency thereof will be improved as compared with a case in which the water vapor is produced from water. In the case of a conventional construction shown in FIG. 20, the gas that permeates through the membrane 33 is a mixture gas consisting of carbon dioxide and water vapor, so that the gas cannot be re-utilized as it is. Also, supposing that carbon dioxide and water vapor are to be separated from each other, a method of cooling this gas, for example, by heat exchange so as to liquefy the water vapor contained in the mixture gas into a state of water can be conceived. However, by this method, the heat recovered by heat exchange will be enormous in amount, so that it is extremely difficult to utilize the whole heat. On the other hand, with the present apparatus 1 shown in FIG. 1, there is no need to perform a cooling treatment, so that, by using the discharged water vapor as it is, the latent heat that the water vapor has can be effectively used as it is, whereby a system having higher energy efficiency than in a conventional case can be realized.

Hereafter, description will be given on the construction of the first separation membrane 33 and the second separation membrane 34.

Figure 2:
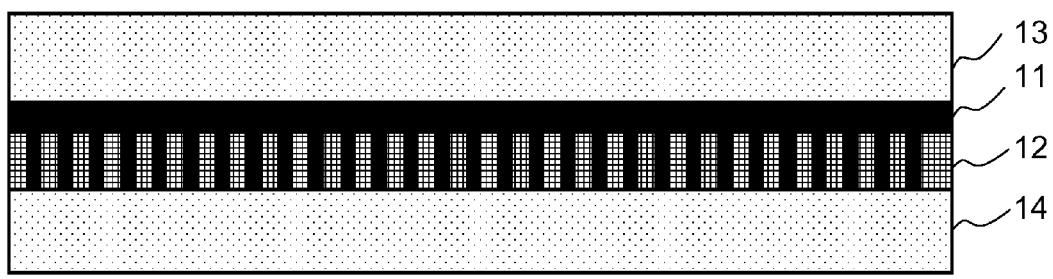
FIG. 2 is a cross-sectional view schematically illustrating a structure of a first separation membrane.

For the first separation membrane 33, a polyvinyl alcohol-polyacrylic acid (PVA/PAA) salt copolymer is used as one example of a membrane material, and cesium carbonate ($Cs_2CO_3$) is used as a carbon dioxide carrier. Also, as schematically shown in FIG. 2, the first separation membrane is constructed to have a three-layer structure in which a hydrophilic porous membrane 12 that carries a PVA/PAA gel membrane 11 containing a carbon dioxide carrier is sandwiched between two sheets of hydrophobic porous membranes 13 and 14. Hereafter, the PVA/PAA salt copolymer gel membrane that contains a carbon dioxide carrier will be referred to as a "carrier-containing gel membrane" as appropriate in order to distinguish the membrane from a PVA/PAA salt copolymer gel membrane that does not contain a carbon dioxide carrier and a facilitated transport membrane having a structure provided with two sheets of hydrophobic porous membranes. Also, with the whole weight of the PVA/PAA salt copolymer and $Cs_2CO_3$ in this carrier-containing gel membrane being a standard, the PVA/PAA salt copolymer is present in a range of about 20 to 80 wt %, and $Cs_2CO_3$ is present in a range of about 20 to 80 wt % in the carrier-containing gel membrane.

Figure 3:
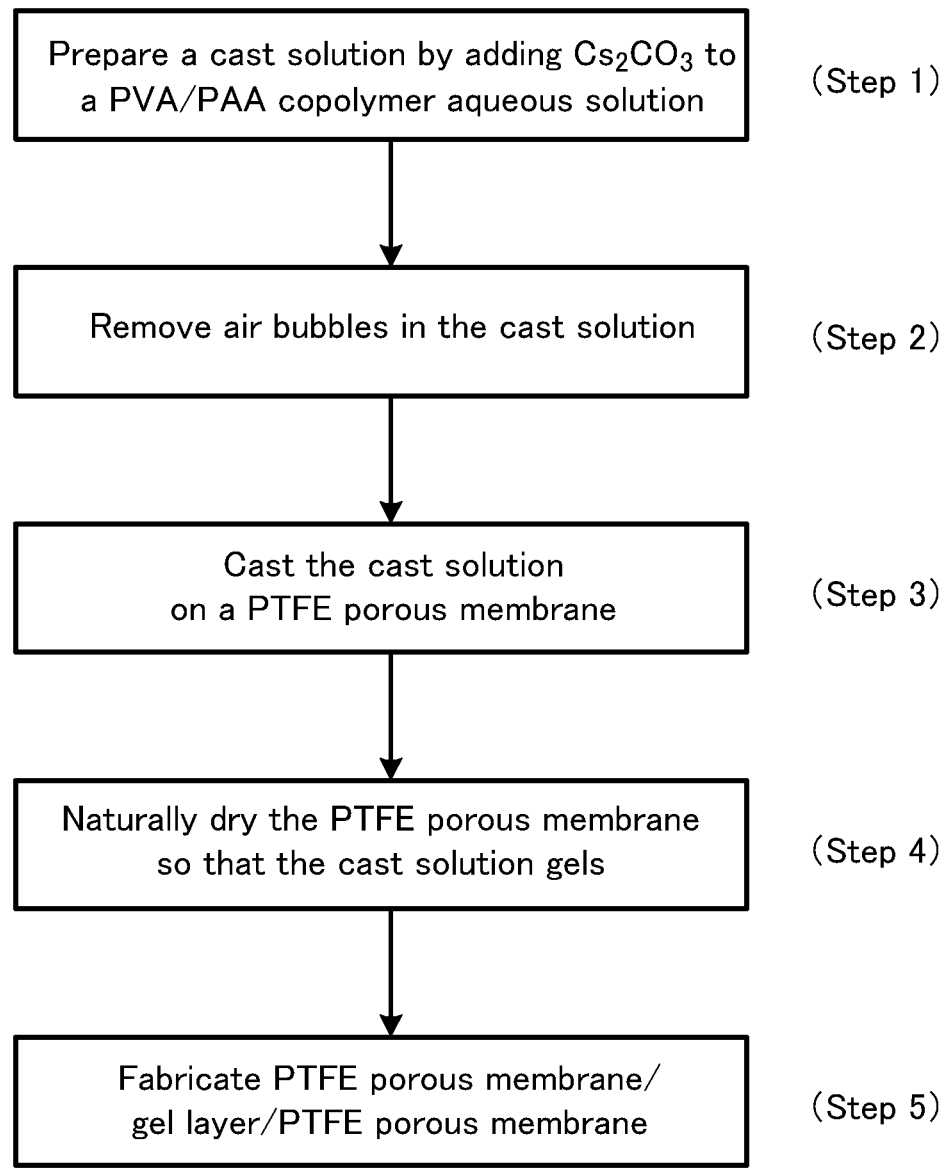
FIG. 3 is a flowchart showing one embodiment of a method for fabricating the first separation membrane.

One example of a method for fabricating the first separation membrane 33 as described above is as shown in the flowchart of FIG. 3.

That is, first, a cast solution made of an aqueous solution containing a PVA/PAA salt copolymer and $Cs_2CO_3$ is prepared (step 1). In more detail, 1 g of a PVA/PAA salt copolymer (for example, a provisional name of SS gel manufactured by Sumitomo Seika Chemicals Co., Ltd.) and 0.54 g of $Cs_2CO_3$ are weighed and put into a sample bottle, and further 20 g of water is added to this. The resultant is stirred for a day at room temperature for dissolution, so as to obtain a cast solution.

Subsequently, in order to remove the air bubbles in the cast solution obtained in step 1, centrifugation (30 minutes with the rotation number of 5000 rpm) is carried out (step 2).

Next, the cast solution obtained in step 2 is cast by an applicator on a surface of a hydrophilic PTFE porous membrane side of a layered porous membrane obtained by laying a hydrophilic PTFE porous membrane (for example, H010A142C manufactured by Advantec Co., Ltd., having a thickness of 80 μm, a pore diameter of 0.1 μm, and a porosity of 70%) on a hydrophobic PTFE porous membrane (for example, Fluoropore FP010 manufactured by Sumitomo Electric Industries, Ltd., having a thickness of 60 μm, a pore diameter of 0.1 μm, and a porosity of 55%) (step 3). Here, the cast solution penetrates into the pores within the hydrophilic PTFE porous membrane; however, the penetration stops at the boundary surface to the hydrophobic PTFE porous membrane. Therefore, the cast solution does not penetrate down to the opposite surface of the layered porous membrane, so that the cast solution will not be present on the surface of the hydrophobic PTFE porous membrane side of the layered porous membrane, thereby facilitating the handling.

Next, after the casting, the hydrophilic PTFE porous membrane is naturally dried for about half a day at room temperature, so that the cast solution gels to form a gel layer (step 4). In the above production method, the cast solution is cast on the surface of the hydrophilic PTFE porous membrane side of the layered porous membrane in step 3, so that the gel layer is liable to be formed not only on the surface (cast surface) of the hydrophilic PTFE porous membrane but also to fill the inside of the pores in step 4, whereby defects (fine defects such as pinholes) are hardly produced, and the ratio of success of forming the membrane of the gel layer will be high. Here, in step 4, it is desirable that the naturally dried PTFE porous membrane is further thermally cross-linked at a temperature of about 120° C. for about 2 hours.

Subsequently, the same hydrophobic PTFE porous membrane as the hydrophobic PTFE porous membrane of the layered porous membrane used in step 3 is superposed on the gel layer side surface of the hydrophilic PTFE porous membrane obtained in step 4, so as to obtain a facilitated transport membrane (first separation membrane 33) having a three-layer structure made of hydrophobic PTFE porous membrane/gel layer (carrier-containing gel membrane carried on the hydrophilic PTFE porous membrane)/hydrophobic PTFE porous membrane as schematically shown in FIG. 2 (step 5). Here, FIG. 2 shows a schematic view linearly displaying a state in which the inside of the pores of the hydrophilic PTFE porous membrane 12 is filled with the carrier-containing gel membrane 11.

Also, by providing a three-layer structure in which the gel layer is sandwiched between the hydrophobic PTFE porous membranes, one of the hydrophobic PTFE porous membranes is used in step 3 and step 4 for supporting the hydrophilic PTFE porous membrane carrying the carrier-containing gel membrane and preventing penetration of the cast solution, and the other one of the hydrophobic PTFE porous membranes is used for protecting the carrier-containing gel membrane from the other surface side.

Further, even when water vapor is condensed on the membrane surface of the hydrophobic PTFE porous membrane, water is repelled and prevented from penetrating into the carrier-containing gel membrane because the PTFE porous membrane is hydrophobic. Therefore, it is possible to prevent the carbon dioxide carrier in the carrier-containing gel membrane from being diluted with water and also to prevent the diluted carbon dioxide carrier from flowing out from the carrier-containing gel membrane.

Hereafter, the membrane performance of the first separation membrane 33 produced by the above-described method will be described. In evaluating the membrane performance, an experiment apparatus shown in FIG. 4 was conceived.

Figure 4:
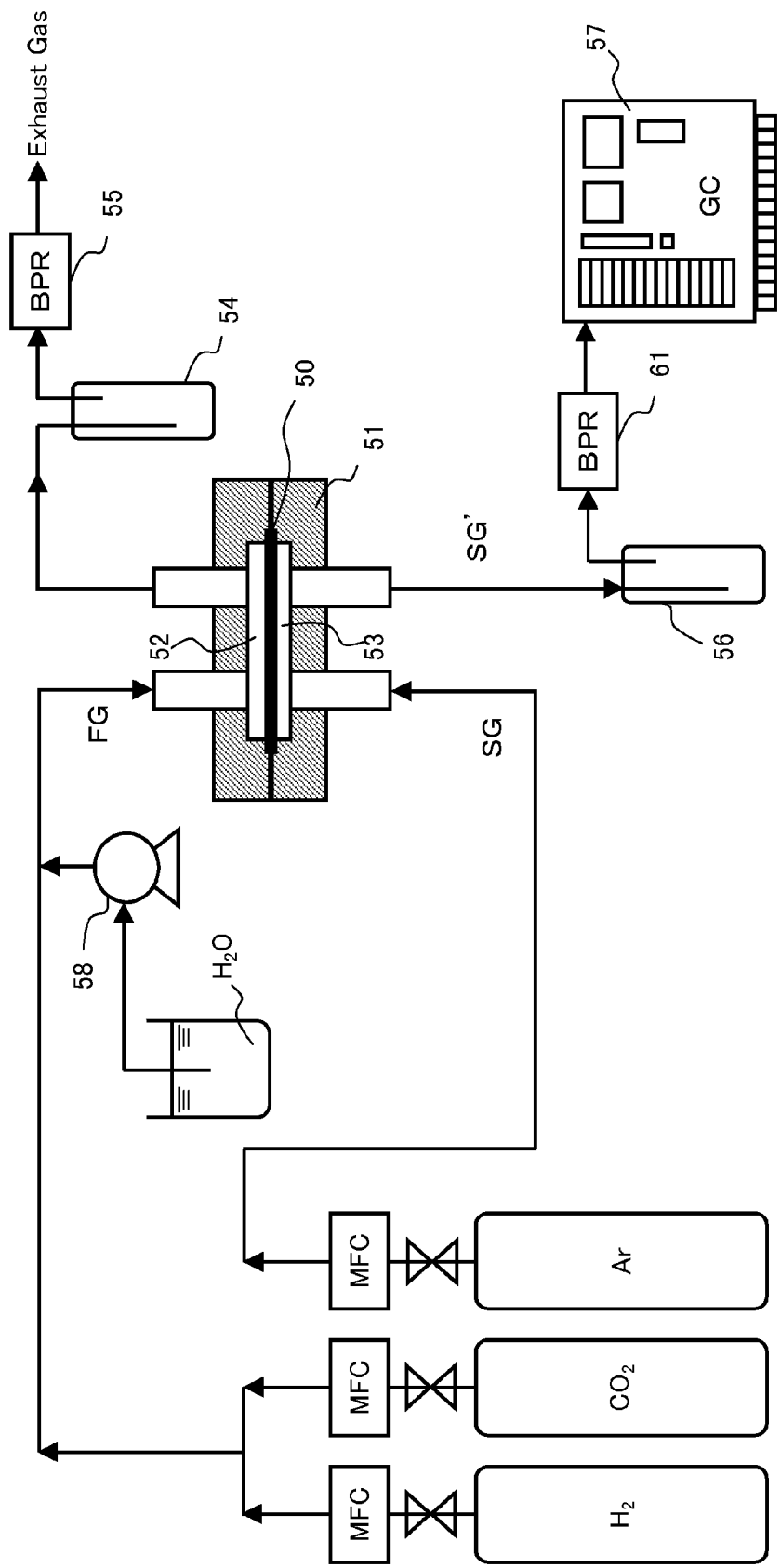
FIG. 4 is a construction view of an experiment apparatus for evaluating a membrane performance of the first separation membrane.

As shown in FIG. 4, each sample 50 is fixed between a feed side chamber 52 and a permeate side chamber 53 of a flow type gas permeation cell 51 made of stainless steel (membrane area: 2.88 cm$^2$) by using two sheets of gaskets made of fluororubber as sealing materials. A feed gas A (mixture gas made of $CO_2$, $H_2$, and $H_2O$) FG is supplied to the feed side chamber 52 at a flow rate of $2.24 \times 10^{-2}$ mol/min, and a sweep gas (which is assumed to be Ar gas here) SG is supplied to the permeate side chamber 53 at a flow rate of $8.18 \times 10^{-4}$ mol/min. The pressure of the feed side chamber 52 is adjusted by a back pressure regulator 55 disposed on the downstream side of a cooling trap 54 located in the midway of a discharging path of the exhaust gas. The pressure in the permeate side chamber 53 is an atmospheric pressure. The gas composition after the water vapor in the sweep gas SG' discharged from the permeate side chamber 53 is removed by a cooling trap 56 is quantitated by a gas chromatograph 57; the permeance [mol/(m$^2$·s·kPa)] of $CO_2$ and $H_2$ is calculated from this and the flow rate of Ar in the sweep gas SG; and the $CO_2/H_2$ selectivity is calculated from the ratio. Here, a back pressure regulator 61 for pressure adjustment of the permeate side chamber 53 is provided on the downstream side of the cooling trap 56. Here, regarding the supply amount of the feed gas A, the supply amount of $CO_2$ and $H_2$ is adjusted by a mass flow rate controller (mass flow controller: MFC), and the supply amount of $H_2O$ is adjusted by a metering liquid-feeding pump 58 in a liquid state.

The feed gas A is a mixture gas containing hydrogen as a major component and containing carbon dioxide and water vapor for imitating the first mixture gas, and was adjusted to have a mixing ratio (mol %) of $CO_2$: 5.0%, $H_2$: 45%, and $H_2O$: 50%.

The sweep gas SG is supplied for lowering the partial pressure on the permeate side chamber side of the gas to be measured ($CO_2$, $H_2$) that permeates through the sample membrane, so as to maintain the driving force for permeation, and gaseous species (Ar gas) different from the gas to be measured is used. Specifically, Ar gas (flow rate at 25° C.: 20 cm$^3$/min, $8.13 \times 10^{-4}$ mol/min) was supplied to the permeate side chamber 53.

Here, although not illustrated in the drawings, in order to maintain the operating temperature of the sample membrane and the temperatures of the feed gas FG and the sweep gas SG to be constant, the experiment apparatus has a pre-heater for heating the above gases, and the flow type gas permeation cell in which the sample membrane is fixed is disposed within a thermostated oven.

Here, although FIG. 4 illustrates as if only the gas SG on the sweep side could be measured by the gas chromatograph 57, the gas FG on the feed side can be measured as well by connecting it to a line of the gas chromatograph 57.

Figure 5:
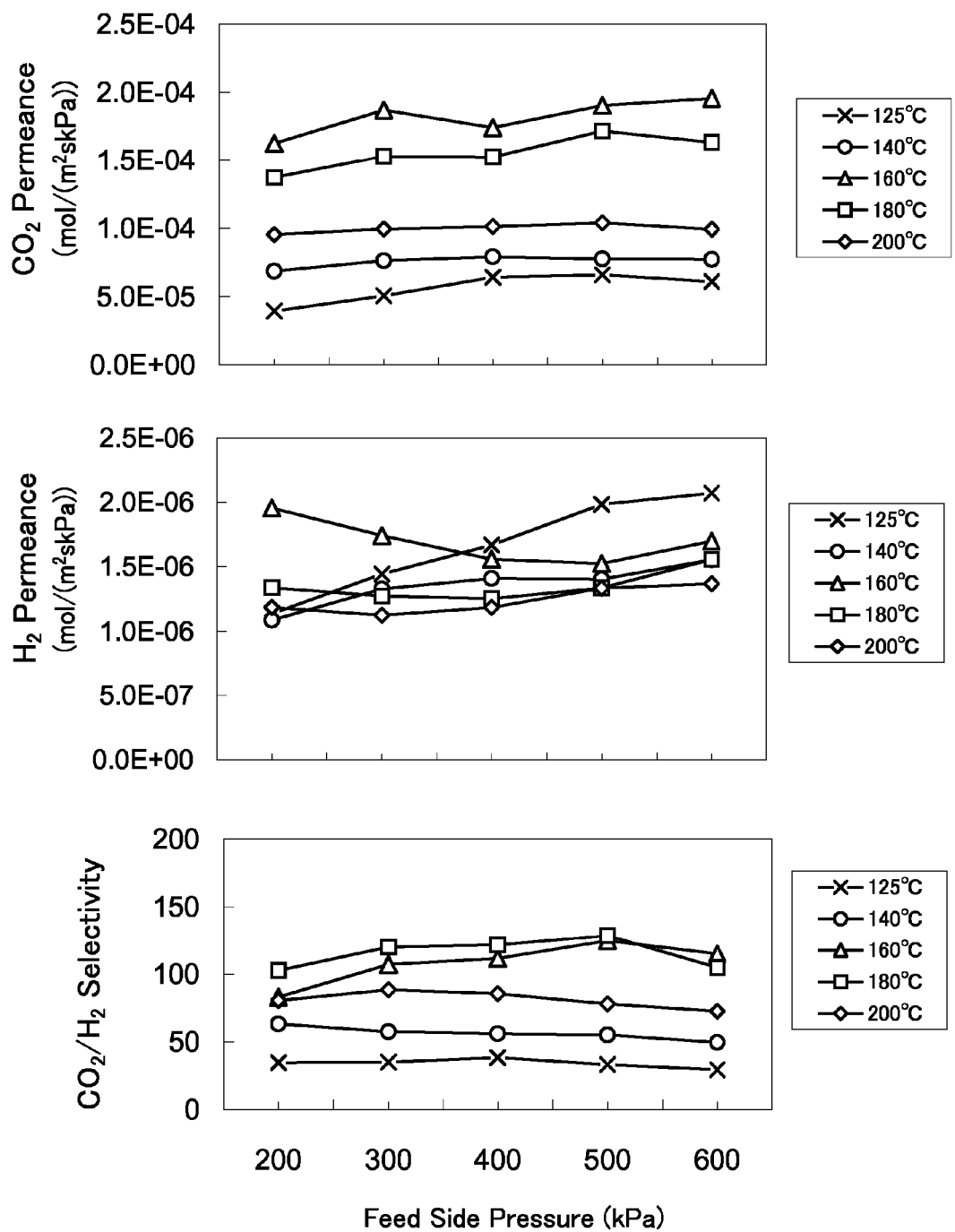
FIG. 5 is a graph showing dependence of the $CO_2$ permeance, $H_2$ permeance, and $CO_2/H_2$ selectivity of a facilitated transport membrane using $Cs_2CO_3$ as a carrier on the temperature and pressure of the feed gas.

Under such a condition, FIG. 5 shows a graph depicting the $CO_2$ permeance, the $H_2$ permeance, and the $CO_2/H_2$ selectivity when the measurement temperature is changed to 125° C., 140° C., 160° C., 180° C., and 200° C. by setting the ratio of (weight of $Cs_2CO_3$)/(weight of PVA/PAA salt copolymer+ weight of $Cs_2CO_3$) (hereafter referred to as a "carrier concentration") to be 70% and keeping the pressure of the feed gas FG in a pressurized state within a range of 200 kPa to 600 kPa.

According to FIG. 5, it will be understood that the $CO_2$ permeance shows a very high value of about $1 \times 10^{-4}$ mol/(m$^2$·s·kPa) even under a high temperature condition with a measurement temperature of 200° C., thereby exhibiting a high $CO_2$ selectivity of about 100. Also, it will be understood that, when the measurement temperature is about 160° C., higher $CO_2$ permeance and $CO_2$ selectivity are exhibited.

Here, a $CO_2$ selective permeation performance under a high temperature condition can be realized in the same manner even when cesium hydroxide, cesium bicarbonate, rubidium carbonate, rubidium hydroxide, or rubidium bicarbonate is used as the carrier of the first separation membrane 33 besides the above $Cs_2CO_3$ (cesium carbonate). Further, a $CO_2$ selective permeation performance under a high temperature condition can be realized in the same manner even with a construction using DAPA ($NH_2$—$CH_2$—$CH(NH_2)$—COOH) as a carrier.

Next, the membrane performance of the second separation membrane 34 will be described.

As the second separation membrane 34, a membrane exhibiting a selective permeation property for $H_2O$ is adopted, and a perfluoro-based membrane (or a perfluorosulfonic acid-based membrane) can be utilized as one example.

Figure 6:
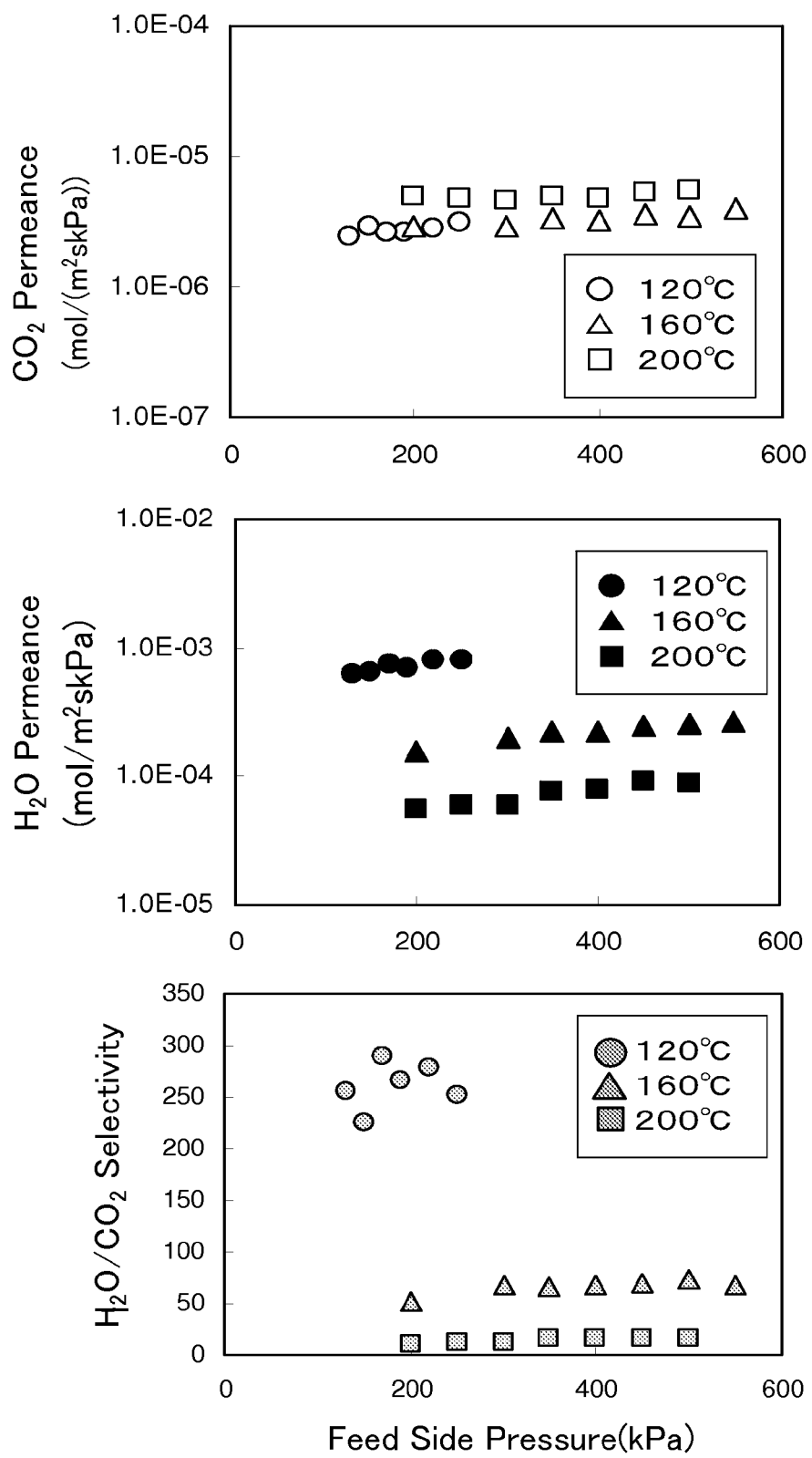
FIG. 6 is a graph showing dependence of the $CO_2$ permeance, $H_2O$ permeance, and $H_2O/CO_2$ selectivity of a second separation membrane on the temperature and pressure when a sweep gas is supplied.

FIG. 6 shows a graph depicting the $CO_2$ permeance, the $H_2O$ permeance, and the $H_2O/CO_2$ selectivity of the second separation membrane 34. As the measurement condition, a mixture gas containing water vapor, nitrogen, and carbon dioxide and adjusted to have a mixing ratio (mol %) of $CO_2$: 2.0%, $H_2$: 48%, and $H_2O$: 50% was used as the feed gas. Each value is made into a graph when the measurement temperature is changed to 120° C., 160° C., and 200° C. by keeping the pressure of the feed gas FG in a pressurized state within a range of 200 kPa to 600 kPa. Here, a perfluorosulfonic acid-based membrane was used as the second separation membrane 34. The measurement mechanism is the same as that of FIG. 4.

The $H_2O$ permeance was calculated by liquefying the permeated steam in a drain tank 56 and measuring the amount of water pooled in the drain tank per unit period of time. Also, the $CO_2$ permeance was calculated by a method similar to that of the $CO_2$ facilitated transport membrane, and the property of selective permeation of $H_2O$ over $CO_2$ was calculated from the $H_2O$ permeance/$CO_2$ permeance. Here, Ar is used as the sweep gas.

According to the graph of FIG. 6, the highest values are exhibited in both of the $H_2O$ permeance and the $H_2O/CO_2$ selectivity under a measurement temperature of 120° C. Here, an $H_2O/CO_2$ selectivity of about 60 is exhibited even in the case of 160° C. It will be understood that, according as the reaction temperature rises, the $H_2O$ permeance and the $H_2O/CO_2$ selectivity decrease.

Figure 7A:
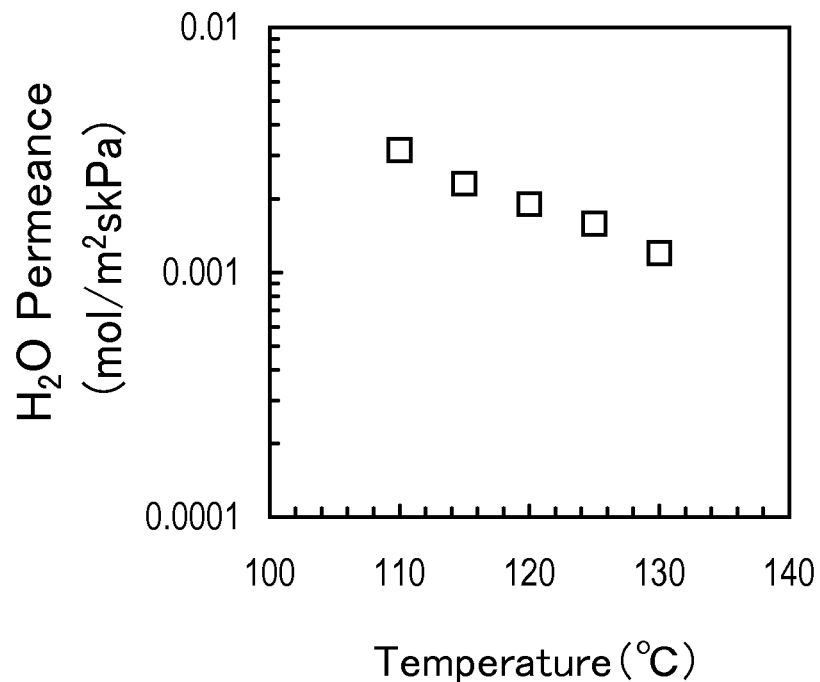
FIG. 7 is a graph showing dependence of the $H_2O$ permeance and $H_2O/CO_2$ selectivity of the second separation membrane with a measurement temperature of 100° C. to 130° C. on the temperature and pressure when the sweep gas is not supplied.
Figure 7B:
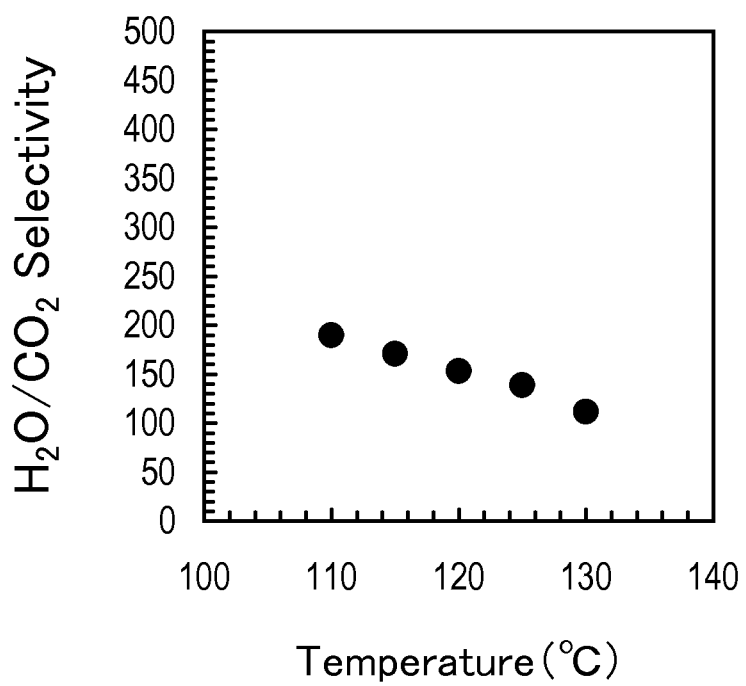
Figure 8A:
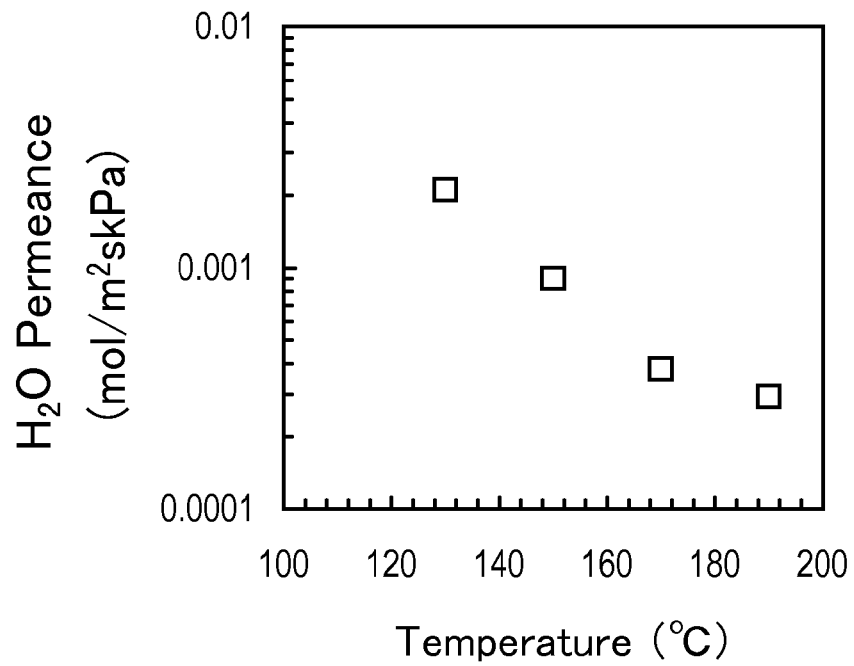
FIG. 8 is a graph showing dependence of the $H_2O$ permeance and $H_2O/CO_2$ selectivity of the second separation membrane with a measurement temperature of 130° C. to 190° C. on the temperature and pressure when the sweep gas is not supplied.
Figure 8B:
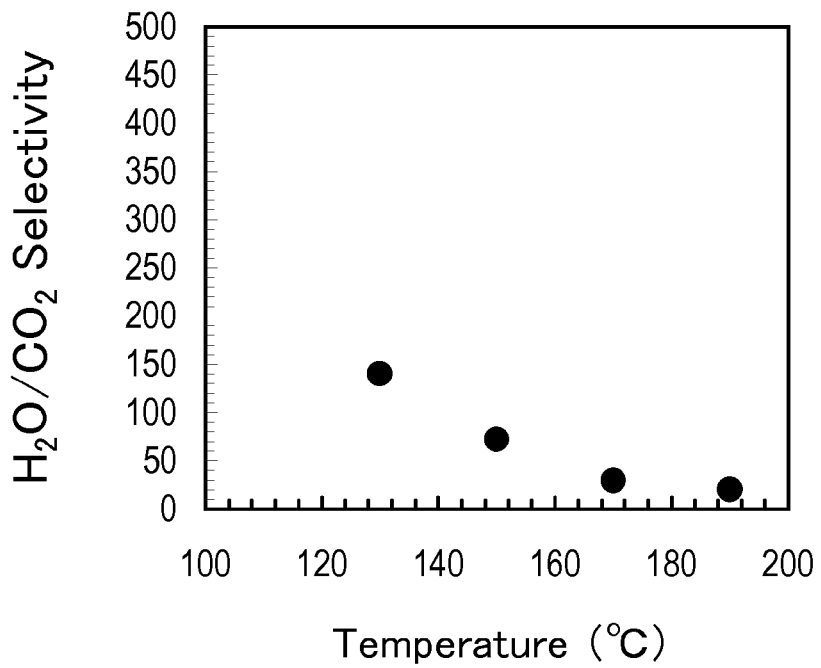

FIGS. 7 and 8 are graphs showing a case in which the performance of the steam selective membrane is measured without using the sweep gas SG. Here, the membrane-permeated gas needs to be sent to the gas chromatograph 57 during the measurement, so that Ar gas is let to flow in from the upstream of the drain tank 56.

FIG. 7 shows a change in (a) $H_2O$ permeance and (b) $H_2O/CO_2$ selectivity when the measurement temperature is raised each time by 5° C. from 110° C. to 130° C. in a state in which the supply side pressure is fixed to 200 kPa and the permeation side pressure is fixed to an atmospheric pressure. Here, regarding the supply side gas flow rate, $H_2$ was set to be 8 ml/min, $CO_2$ was set to be 152 ml/min, and $H_2O$ (liquid) was set to be 0.54 ml/min.

FIG. 8 shows a change in (a) $H_2O$ permeance and (b) $H_2O/CO_2$ selectivity when the measurement temperature is raised each time by 20° C. from 130° C. to 190° C. in a state in which the supply side pressure is fixed to 200 kPa and the permeation side pressure is fixed to an atmospheric pressure. Here, regarding the supply side gas flow rate, $H_2$ was set to be 8 ml/min, $CO_2$ was set to be 152 ml/min, and $H_2O$ (liquid) was set to be 0.27 ml/min.

In FIGS. 7 and 8 as well, it can be read out that, according as the measurement temperature rises, the $H_2O$ permeance and the $H_2O/CO_2$ selectivity decrease.

Out of the first mixture gas produced after execution of the shift reaction at about 160° C. in the first treatment section 32, the second mixture gas containing water vapor and carbon dioxide is supplied to the second separation membrane 34 by penetrating though the first separation membrane 33. Therefore, this second mixture gas is supplied to the second separation membrane 34 under a temperature condition of about 100° C. or higher and 160° C. or lower. Therefore, according to FIGS. 6 to 8, the water vapor contained in the gas permeates selectively through the second separation membrane 34, so that water vapor and carbon dioxide can be separated.

Further, the water vapor obtained by permeation through this second separation membrane 34 is in a state of having sufficient latent heat because the water vapor has a temperature of the same degree as that of the second mixture gas supplied to the second separation membrane 34. Therefore, by recovering and re-utilizing this water vapor, high energy efficiency can be realized.

Here, in the above-described embodiment, the membrane reactor 20 shown in FIG. 1 has a construction including a first treatment section 32 having a first separation membrane 33 formed on at least a part of an outer circumferential surface of an occupied space thereof, the inside of the first treatment section 32 being filled with a CO shift catalyst, and a second treatment section 36 having a second separation membrane 34 formed on at least a part of an outer circumferential surface of an occupied space thereof. On the other hand, the membrane reactor 20 may have a construction in which only the first treatment section 32 is included, and the second treatment section 36 is provided as a different mechanism outside of the membrane reactor 20. In this case, the gas (first mixture gas) that has permeated through the first separation membrane 32 in the membrane reactor 20 may be guided to the second treatment section constructed outside of the reactor 20 via a pipe line.

Also, in the above-described embodiment, description has been given by using one having a structure of flat plate type as shown in FIG. 2 as one example of the first separation membrane 33; however, one having a shape of cylindrical type as shown in FIG. 9 may be used as well.

Figure 9A:
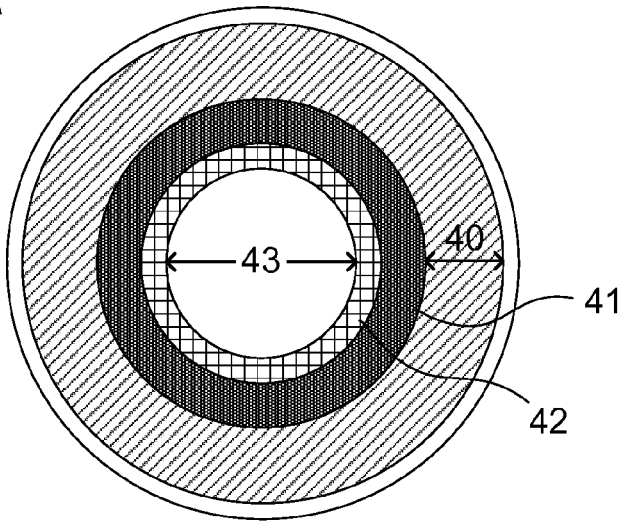
FIG. 9 is a cross-sectional view schematically illustrating an example of a cylindrical type of the first separation membrane.
Figure 9B:
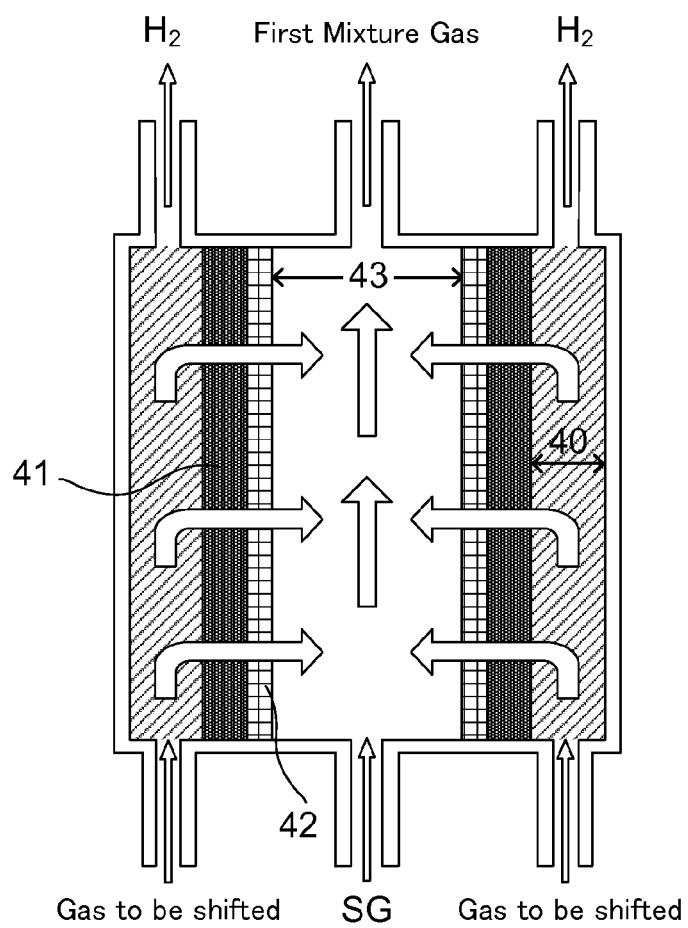

In FIG. 9, FIG. 9A shows a cross-sectional view when the first separation membrane is cut parallel to the horizontal surface, and FIG. 9B shows a cross-sectional view when the first separation membrane is cut perpendicularly to the horizontal surface. The first separation membrane shown in FIG. 9 has a structure such that a gel membrane 41 including a carrier is carried on an outer circumference of a support membrane 42 made of ceramics and having a cylindrical shape. As the carrier, the above $Cs_2CO_3$ can be used. Here, the support membrane 42 is not limited to a ceramic membrane (the same applies to a support membrane 62 shown in FIG. 11).

Here, in FIG. 9, a space 40 between the gel membrane 41 and the outer frame is filled with a shift catalyst. By this, it is conceived that the shift treatment and the separation treatment by the first separation membrane are carried out within an identical apparatus having a cylindrical shape. Here, a space 43 is provided also in the inside of the support membrane 42 made of ceramics.

More specifically, as shown in FIG. 9B, the gas to be shifted flows into the space 40 filled with the shift catalyst, and a shift treatment is carried out in the space. Thereafter, out of the produced mixture gas, the first mixture gas containing carbon dioxide and water vapor flows into the space 43 by permeating through the gel membrane 41 and the support membrane 42. Then, the first mixture gas that has flowed into this space 43 is discharged to the outside of the system by the sweep gas SG and is sent out to the second treatment section provided with the second separation membrane 34. On the other hand, out of the mixture gas produced after the shift treatment, the gas from which water vapor and carbon dioxide have been separated, that is, the gas containing hydrogen as a major component, is discharged from the space 40 outside of the cylinder.

Figure 10:
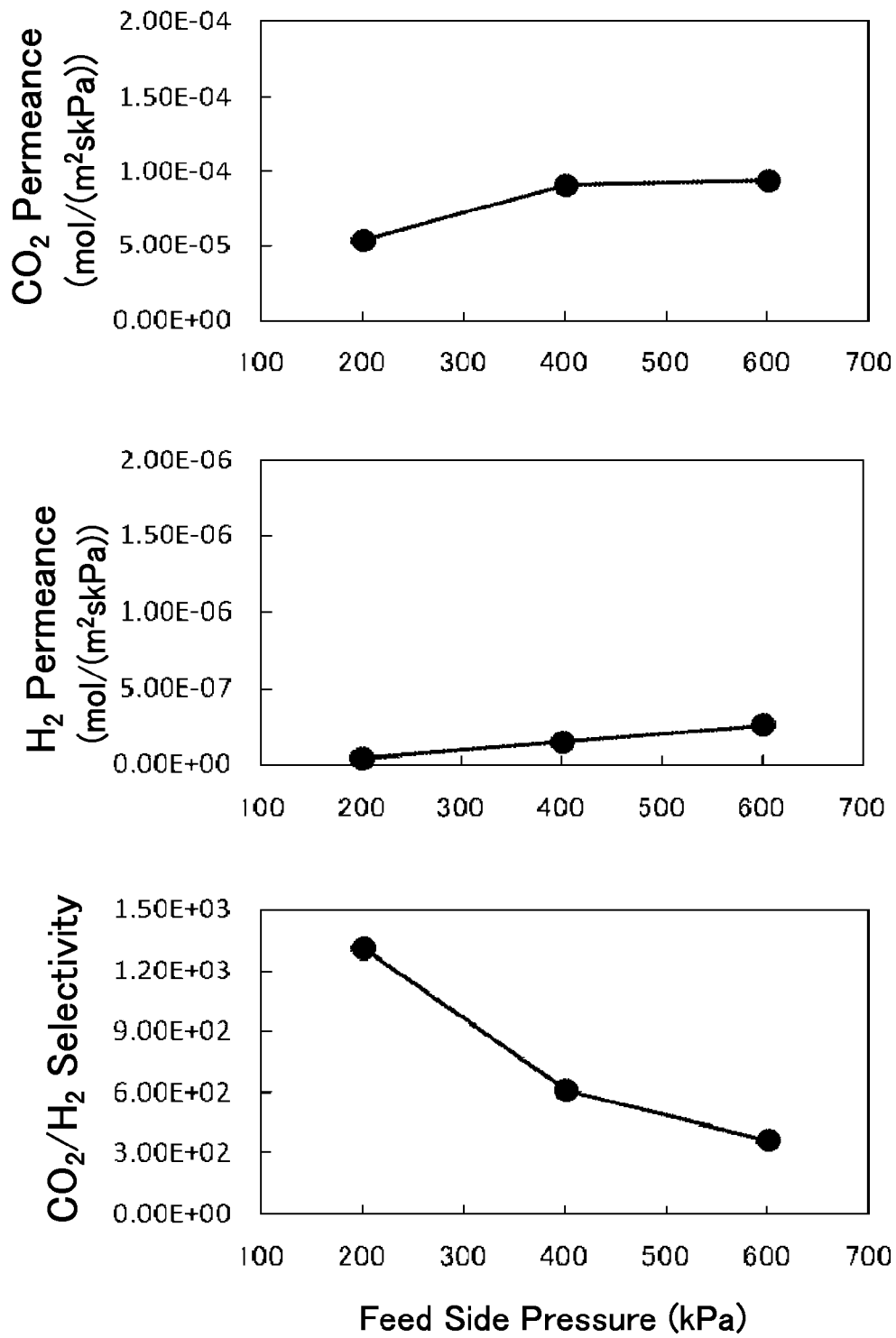
FIG. 10 is a graph showing dependence of the $CO_2$ permeance, $H_2$ permeance, and $CO_2/H_2$ selectivity of the first separation membrane of cylindrical type on the temperature and pressure of the feed gas.

FIG. 10 shows a graph based on the data obtained by using a facilitated transport membrane having a cylindrical shape shown in FIG. 9 as the facilitated transport membrane, setting the measurement method, the carrier concentration, and the feed gas pressure to be the same as those of FIG. 5, and setting the measurement temperature to 160° C. In the same manner as in the case of FIG. 5, the $CO_2$ permeance and the $CO_2/H_2$ selectivity both exhibit high values, and it will be understood that, even with the facilitated transport membrane of cylindrical type, effects similar to those of the flat plate type as shown in FIG. 2 can be produced.

Figure 11A:
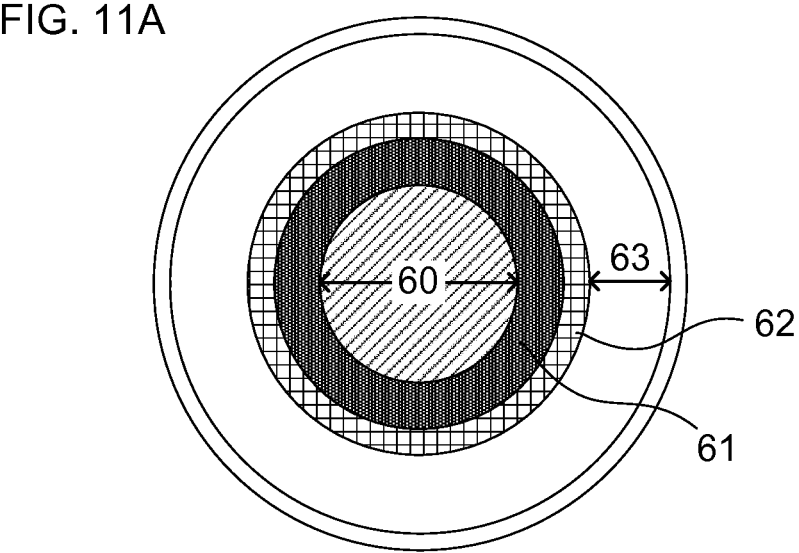
FIG. 11 is another cross-sectional view schematically illustrating an example of a cylindrical type of the first separation membrane.
Figure 11B:
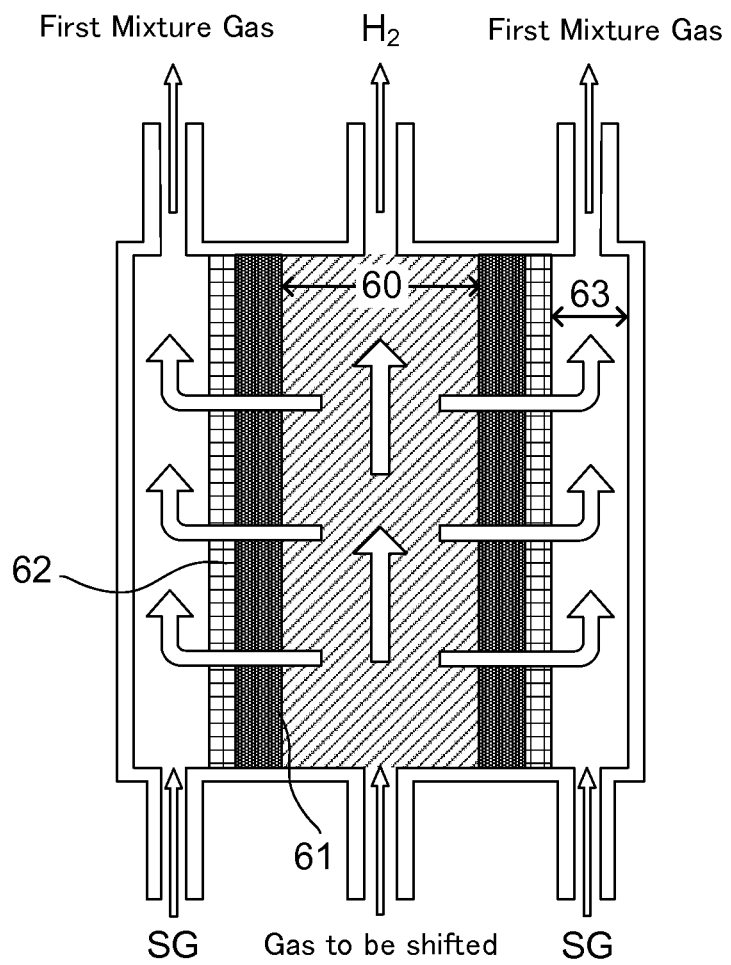

Here, in FIG. 9, a construction is adopted in which the first mixture gas permeates through the gel membrane 41 and the support membrane 42 towards the axial center side (inner side) of the cylindrical shape and flows into the space 43 located in the inside; however, a construction in which the inside and the outside are reversed may be adopted as well (see FIG. 11). That is, the inside of a space 60 having a cylindrical shape within a region including an axial center is filled with a shift catalyst, and a gel membrane 61 and a support membrane 62 are formed in the inside of the outer circumferential surface of the space. Then, the gas to be shifted flows into this space 60, and the first mixture gas produced after being subjected to the shift treatment permeates through the gel membrane 61 and the support membrane 62 towards the outside and flows out into a space 63. By this, the first mixture gas is recovered from the space 63.

Figure 12A:
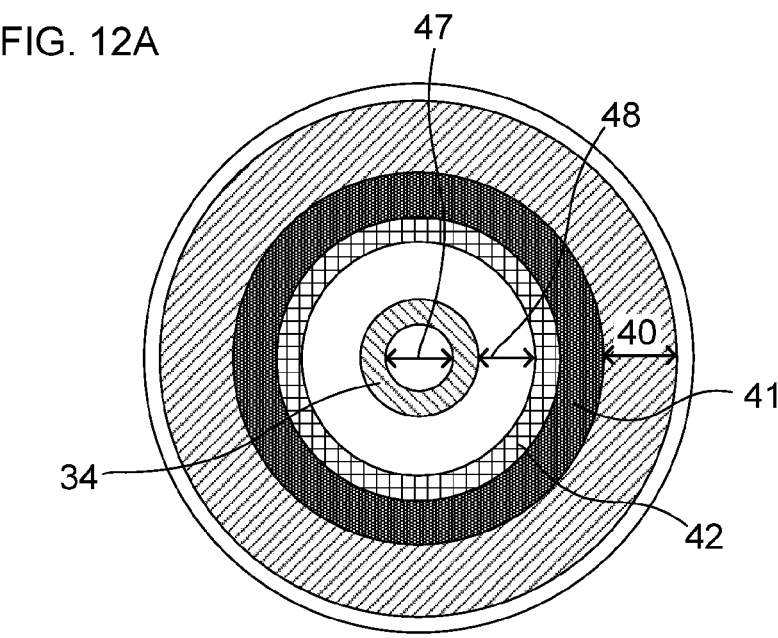
FIG. 12 is another cross-sectional view schematically illustrating an example of a cylindrical type membrane reactor having a first separation membrane and a second separation membrane.
Figure 12B:
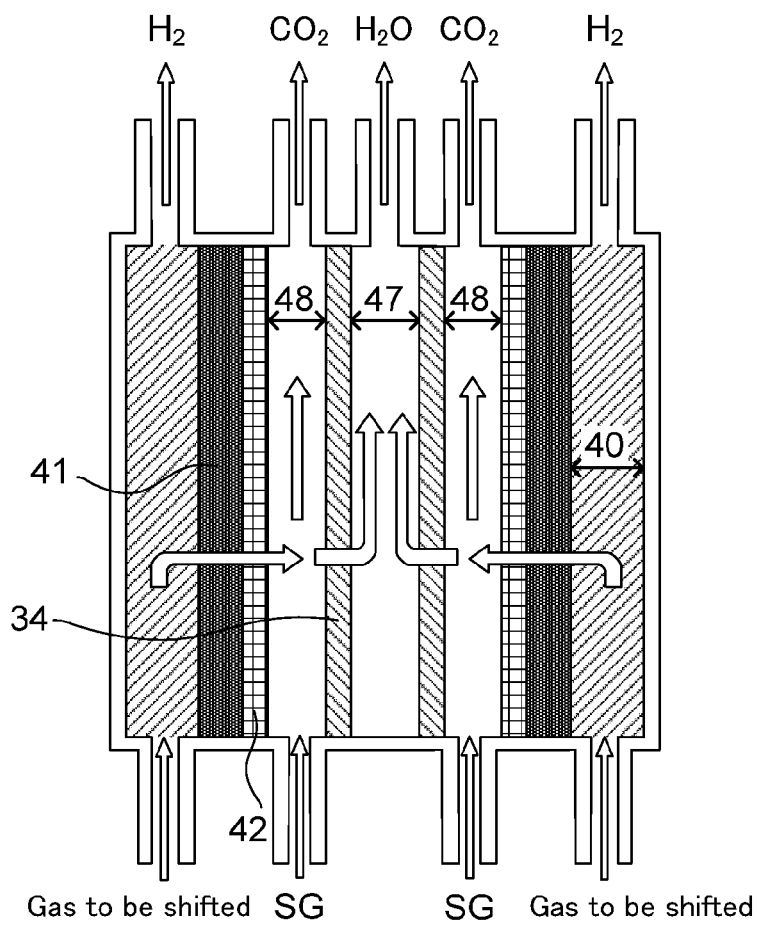

Further, in the construction of FIG. 9, a construction may be adopted in which a different space having a coaxial cylindrical shape is further formed in the space 43, and a second treatment section provided with a second separation membrane 34 on the outer circumference of the different space is provided (see FIG. 12). At this time, water vapor that has permeated through the second separation membrane 34 is discharged from an innermost space 47, and a gas obtained by separation of water vapor from the second mixture gas, that is, a gas containing carbon dioxide as a major component, is discharged from a space 48 located between the second separation membrane 34 and the support membrane 42. Here, in this case, in the case of re-utilizing carbon dioxide, it may be sucked by a pump or the like without letting a sweep gas flow into the space 48.

Here, FIGS. 9 to 12 show a construction including a plurality of spaces and membranes having a coaxial cylindrical shape; however, the method of arranging the spaces is not limited to this, so that, for example, other methods of arrangement such as a construction in which the spaces are arranged in series in an extending direction of the axial center can be utilized as well.

Hereafter, different embodiments will be described.

(1) In the above-described embodiment, a perfluoro-based membrane (or a perfluorosulfonic acid-based membrane) has been mentioned as an example of the second separation membrane 34; however, other membrane materials having a selective permeation property for $H_2O$ can be utilized as well.

Figure 13:
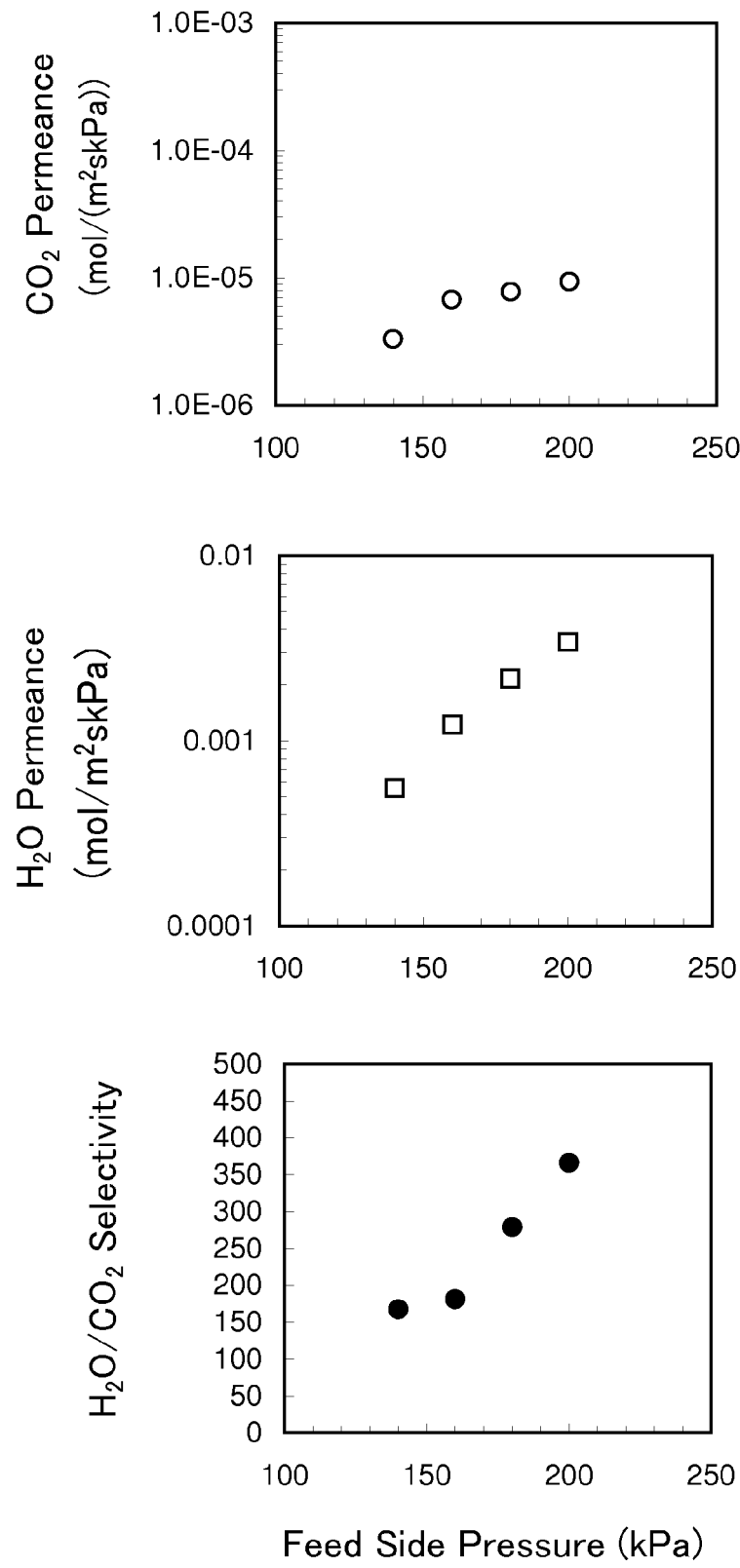
FIG. 13 is a graph showing dependence of the $H_2O$ permeance and $H_2O/CO_2$ selectivity on the pressure when another membrane material is used as the second separation membrane.

FIG. 13 shows a graph depicting the $CO_2$ permeance, the $H_2O$ permeance, and the $H_2O/CO_2$ selectivity of the $H_2O$ permeation membrane adopted in the present different embodiment. As the measurement condition, a mixture gas containing water vapor, nitrogen, and carbon dioxide and supplied at an $H_2O$ (liquid) flow rate of 0.54 ml/min, an $N_2$ flow rate of 8 ml/min, and a $CO_2$ flow rate of 152 ml/min was used as the feed gas. Each value is made into a graph when the measurement temperature is set to be 130° C. and the pressure of the feed gas FG is kept in a pressurized state within a range of 140 kPa to 200 kPa. The other measurement conditions are the same as those of FIGS. 6 to 8.

According to the graph of FIG. 13, a high $H_2O$ permeance and a high $H_2O/CO_2$ selectivity are exhibited in the same manner as in the case of a perfluoro-based membrane (or a perfluorosulfonic acid-based membrane), and it will be understood that the membrane can be utilized as the second separation membrane 34.

A method of producing the membrane adopted in this different embodiment is as follows.

At room temperature, 2.0 g of a PVA-PAA salt copolymer is dissolved in 80.0 g of ion-exchange water. To the obtained SS gel solution, 0.064 g of a 25 mass % aqueous solution of glutaraldehyde is added. Subsequently, the solution is heated at 95° C. for 12 hours to allow chemical cross-linking by glutaraldehyde to proceed, so as to obtain a cast solution.

A hydrophobic PTFE porous membrane (Fluoropore FP-010 manufactured by Sumitomo Electric Industries, Ltd.) is mounted on a glass plate, and a hydrophilic PTFE porous membrane (WPW-020-80 manufactured by Sumitomo Electric Industries, Ltd.) is mounted thereon. On the hydrophilic PTFE porous membrane, the above cast liquid is cast to a thickness of 500 μm with use of a baker applicator. At this time, part of the cast solution fills the inside of the hydrophilic PTFE porous membrane. Thereafter, the cast liquid that has been cast is dried in about 12 hours in a dry box kept to have a humidity of about 5%, so as to form a gel layer. After drying, the formed gel layer is put into a thermostated oven kept at 120° C. together with the glass plate, and thermal cross-linking is carried out for 2 hours to form a steam selective permeation membrane constituted of the hydrophilic PTFE porous membrane and the gel layer. Further, a hydrophobic PTFE porous membrane is laid on the steam selective permeation membrane, so as to obtain a membrane laminate having a three-layer construction of hydrophobic PTFE porous membrane/steam selective permeation membrane/hydrophobic PTFE porous membrane.

In other words, the second separation membrane 34 adopted in the present different embodiment has been realized without adding $Cs_2CO_3$, which is a $CO_2$ carrier, while using the PVA/PAA salt copolymer which is the same material as that of the first separation membrane 33. Here, the second separation membrane 34 can be realized also by adding a slight amount of $Cs_2CO_3$, which is less than in the first separation membrane 33, while using the PVA/PAA salt copolymer.

(2) In the above-described embodiment, a gel membrane constructed with a polyvinyl alcohol-polyacrylic acid salt copolymer is used as the material of the first separation membrane 33; however, this is one example, so that a similar hydrophilic polymer exhibiting a $CO_2$ selective separation capability can be adopted.

Also, regarding the $CO_2$ carrier, in addition to the cesium-based ones (cesium carbonate, cesium hydroxide, cesium bicarbonate) and rubidium-based ones (rubidium carbonate, rubidium hydroxide, rubidium bicarbonate), DAPA has been exemplified for description; however, amino acid-based ones (for example, histidine) other than DAPA may be adopted as well.

(3) In FIG. 1, it has been assumed that the mixture gas is supplied to the membrane reactor 20 from the reformer 31 that carries out water vapor reforming; however, this is an exemplification, so that the supply source of the mixture gas is not limited to the reformer alone. However, in the case of a mechanism utilizing the steam gas in this supply source, the steam can be re-utilized by recovering and supplying the steam that has permeated through the second separation membrane 34.

(4) FIG. 1 shows a construction in which the first separation membrane 33 and the second separation membrane 34 are present in an identical box body, and the mixture gas that has permeated through the first separation membrane 33 is supplied directly to the second separation membrane 34. However, it goes without saying that utterly the same effects can be produced even with a construction in which the mixture gas that has permeated through the first separation membrane 33 is supplied to the second separation membrane 34 via a pipe line (see FIG. 14). Here, in FIG. 14, a pressure regulator or, as necessary, a temperature regulator is provided at a suitable site on the upstream or downstream side of a first treatment section 72, a second treatment section 75 or the like; however, illustration is omitted (the same applies to FIGS. 15 to 17 described later).

Figure 14:
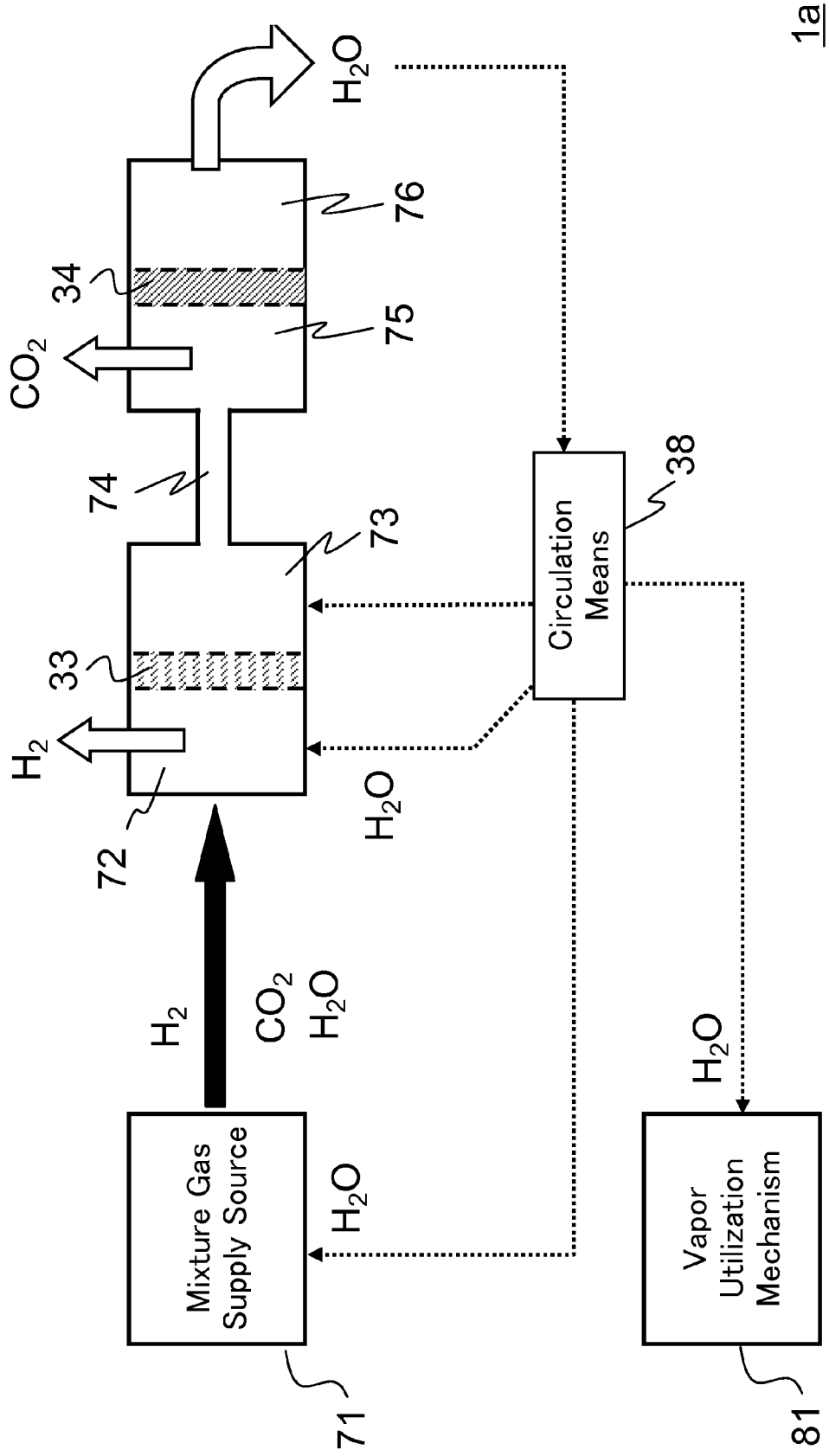
FIG. 14 is a conceptual block diagram of a gas separation apparatus according to the present invention.

FIG. 14 illustrates a gas separation apparatus 1a that separates $CO_2$ and $H_2O$ from a first mixture gas containing $CO_2$, $H_2O$, and a different gas (which is assumed to be $H_2$ here) in consideration also of the contents of the different embodiment (3).

When the first mixture gas is supplied from a mixture gas supply source 71 to the first treatment section 72, the gas separation apparatus 1a shown in FIG. 14 allows $CO_2$ and $H_2O$ to permeate selectively through the first separation membrane 33, whereby the gas (here, $H_2$ gas) that does not permeate through the membrane is selectively separated. A mixture gas (second mixture gas) consisting of $CO_2$ and $H_2O$ that has permeated selectively through the first separation membrane flows from a space 73 via a pipe line 74 into the second treatment section 75, where $H_2O$ permeates selectively through the second separation membrane 34, and the $CO_2$ gas that does not permeate through the membrane is selectively separated. The $H_2O$ gas (steam gas) that has flowed out to a space 76 is in some cases sucked by the circulation means 38, and is sent, for example, to the mixture gas supply source 71 or to each mechanism (first treatment section 72, first separation membrane 33, space 73) located prior to the stage that performs selective separation of $H_2O$ or, in some cases, to a different vapor utilization mechanism 81, so as to be re-utilized.

Figure 15:
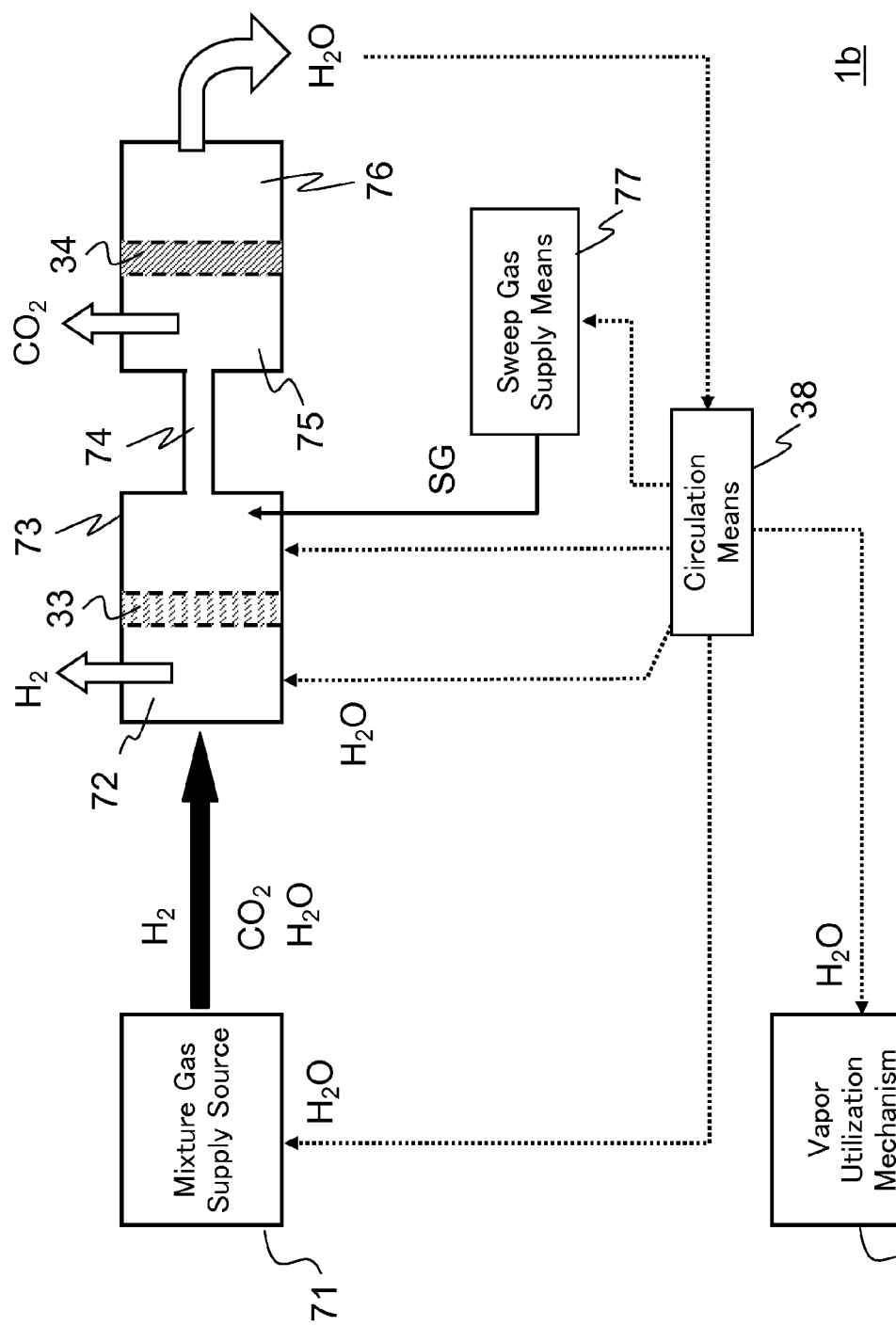
FIG. 15 is another conceptual block diagram of a gas separation apparatus according to the present invention.

Here, part of or the whole of the recovered steam gas may be used as a sweep gas of the gas that has permeated through the first separation membrane 33 (see a gas separation apparatus 1b of FIG. 15). Here, description will be separately given on a case in which the recovered steam gas is supplied as a sweep gas to the subsequent stage side (permeate side) of the first separation membrane 33.

(5) In FIG. 14, the first mixture gas that has not been separated by the first separation membrane 33 in the first treatment section 72 contains $H_2$ as a major component; however, part of $H_2O$ is also contained. This residual $H_2O$ gas contained in the first mixture gas can be newly separated and this can be re-utilized as steam (see FIG. 16).

Figure 16:
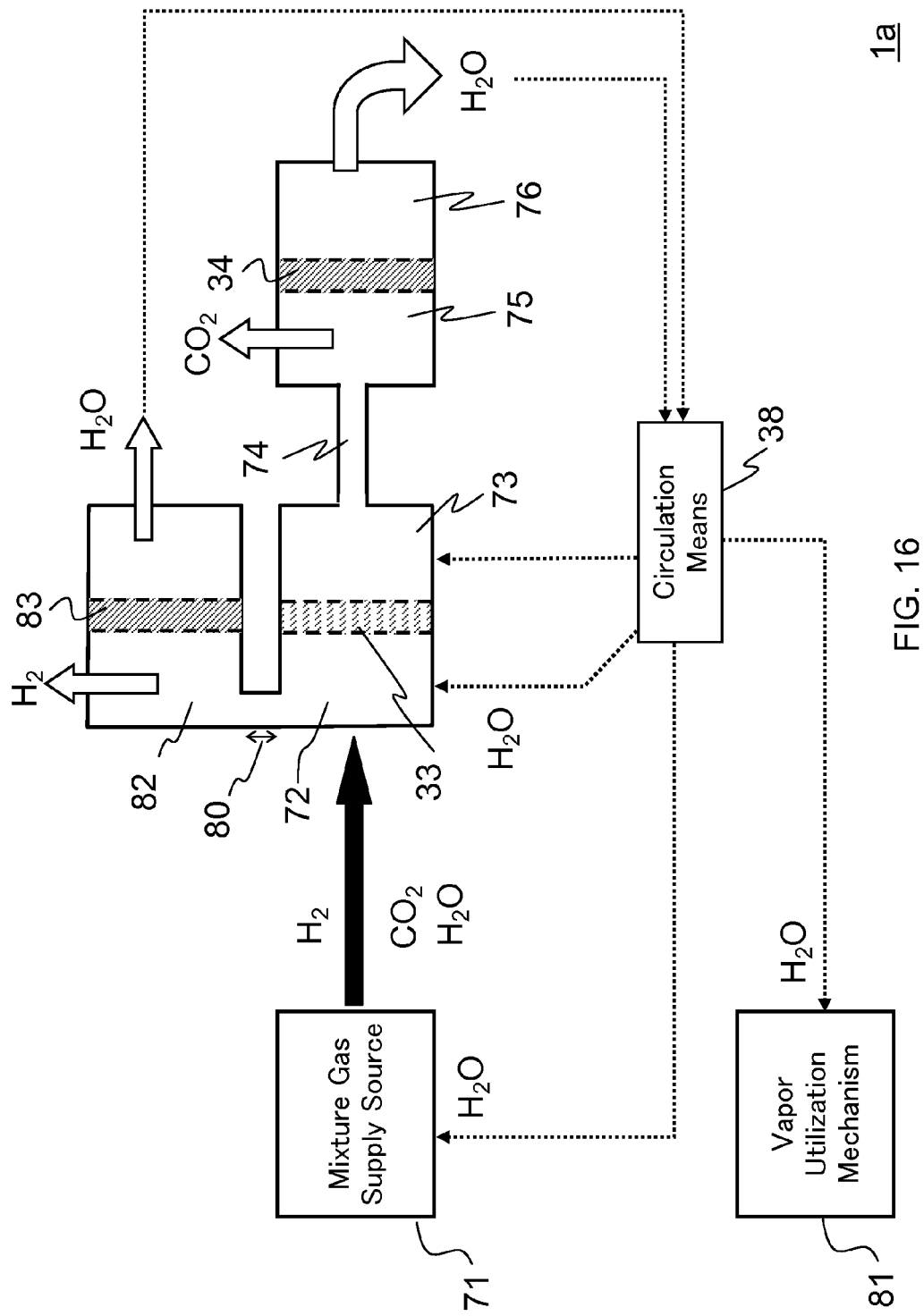
FIG. 16 is a conceptual block diagram of a gas separation apparatus according to the present invention.

In FIG. 16, with respect to the gas separation apparatus 1a shown in FIG. 14, a third treatment section 82 having a third separation membrane 83 made of the same material as that of the second separation membrane 34 is provided. The third treatment section 82 and the first treatment section 72 are connected by a pipe line 80.

The first mixture gas (residual gas) that has not been separated by the first separation membrane 33 is discharged via a pipe line 81 to the third treatment section 82, where $H_2O$ contained in this gas permeates through the third separation membrane 83 and is sent to the circulation means 38. Also, by extracting the gas remaining in the third treatment section 82, a gas containing $H_2$ as a major component can be obtained.

Figure 17:
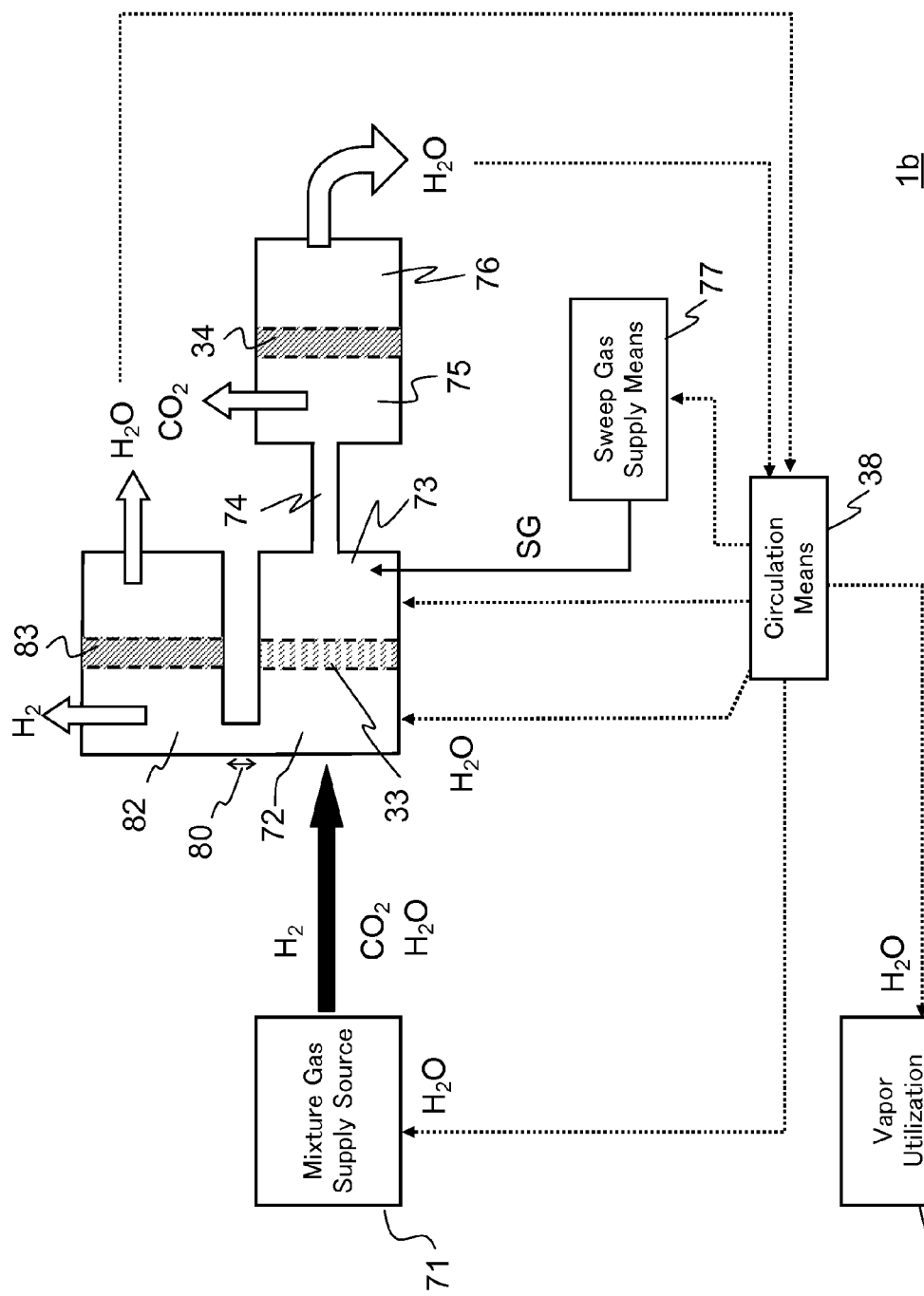
FIG. 17 is a conceptual block diagram of a gas separation apparatus according to the present invention.

A totally similar system can be constructed for the gas separation apparatus 1b shown in FIG. 15 (see FIG. 17). The description thereof will be omitted.

Figure 18A:
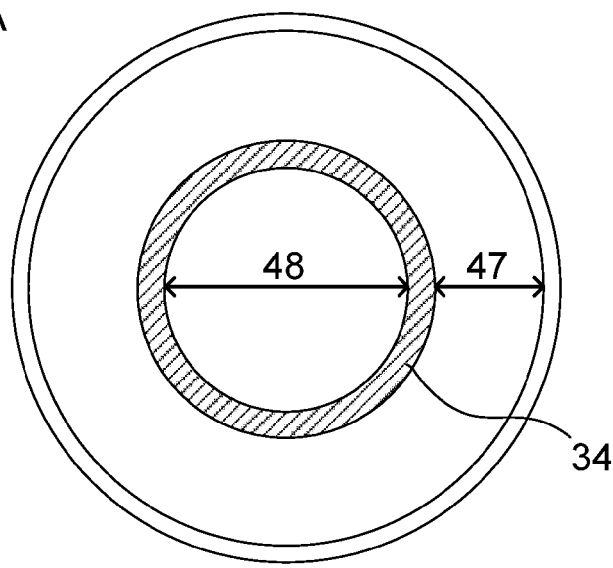
FIG. 18 is a cross-sectional view schematically illustrating an example of a cylindrical type of the second separation membrane.
Figure 18B:
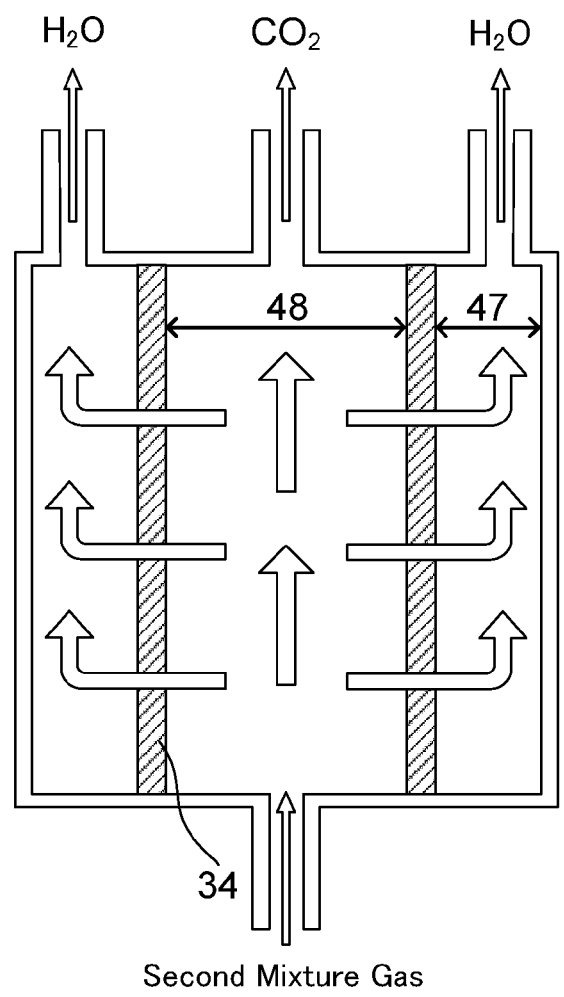

(6) In the above-described embodiment, description has been given by using, as one example of the second separation membrane 34, one showing a flat plate type structure as shown in FIG. 1 or a cylindrical structure that is coaxial with the first separation membrane 33 as shown in FIG. 12; however, the second separation membrane 34 may be singly formed to have a cylindrical structure as shown in FIG. 18.

(7) In the above-described embodiment, structures exemplified in FIGS. 9 and 11 have been described as one example of the case of forming the first separation membrane 33 having a cylindrical structure. In FIGS. 9 and 11, the spaces 40 and 60 located on the previous stage side (supply side) of the first separation membrane 33 are filled with a shift catalyst so as to function as a CO shift treatment section (first treatment section 32). However, without filling the spaces 40 and 60 with a shift catalyst, the structures may as well be constructed as a gas separation apparatus having a single function of allowing carbon dioxide and water vapor to permeate selectively from the first mixture gas containing carbon dioxide gas, hydrogen gas, and water vapor gas. In this case, the gas that flows into the spaces 40 and 60 will not be a gas to be shifted, but will be the first mixture gas. Here, the first mixture gas is not limited to the gas after the CO shift treatment alone.

Figure 19A:
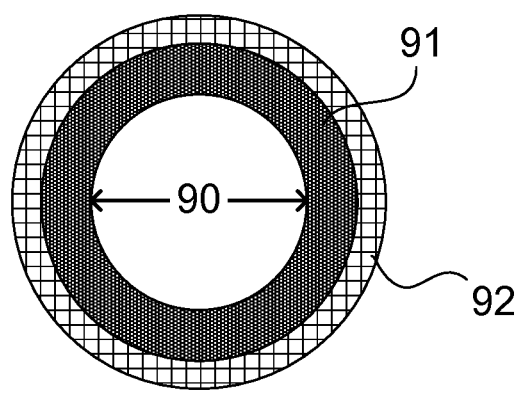
FIG. 19 is a cross-sectional view schematically illustrating a cylindrical structure of a separation membrane in which a separation function layer is formed on an inner circumferential surface of a cylindrical type support.
Figure 19B:
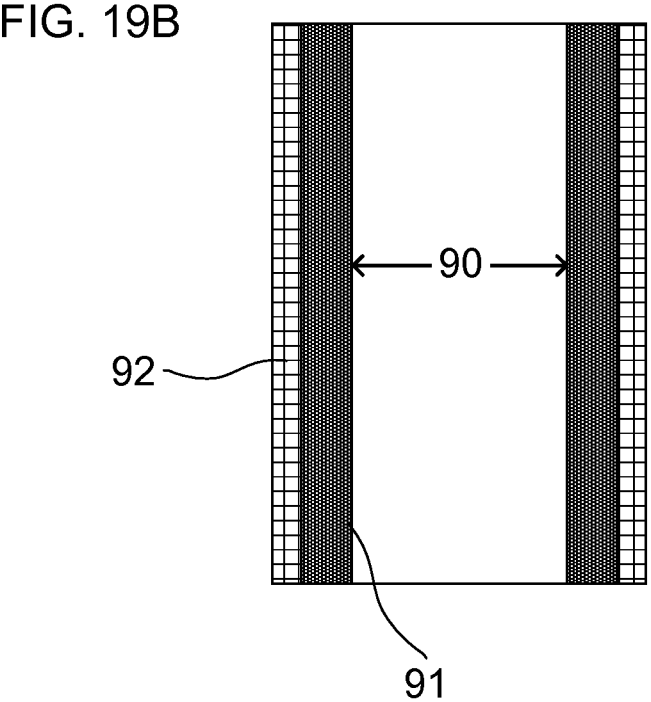

(8) The first separation membrane 33 of cylindrical type exemplified in FIG. 11 has a structure in which a separation function layer 91 is formed on an inner circumferential surface of a cylindrical type support 92 as shown in FIG. 19 irrespective of whether the space 60 is filled with a shift catalyst. Also, the cylindrical structure of inner surface type in which the separation function layer 91 is formed on the inner circumferential surface of the cylindrical type support 92 can be applied not only to first separation membrane 33 but also to the second separation membrane 34.

With regard to the separation membranes 33 and 34 having a cylindrical structure of inner surface type, the separation function layer 91 is formed more preferably in the inside than on the outside of the support 92 in view of hardly damaging the coating layer in bundling a numerous number of fabricated separation membranes to form a module. Here, as long as the inside of the support 92 has a hollow part 90, the shape thereof is not limited. For example, it may have a tubular shape with a polygonal cross-section. Hereafter, examples of the first separation membrane 33 and the second separation membrane 34 having a cylindrical structure of inner surface type and the membrane performance evaluation thereof will be described.

First, an example of the first separation membrane 33 having a cylindrical structure of inner surface type will be described. The construction of the first separation membrane 33 is such that a layer of a PVA/PAA copolymer salt containing cesium carbonate serving as a $CO_2$ carrier is formed as a separation function layer 91 in the inside of a porous support 92 having a cylindrical shape and a thickness of 0.5 mm. The condition for evaluating the membrane performance is as follows. The temperature is 160° C.; the composition ratio of the first mixture gas is $CO_2$: 19%, $H_2$: 19%, and $H_2O$: 62%; the flow rate of the first mixture gas is $2.15 \times 10^{-2}$ mol/min; the supply side pressure is 800 kPa; and the permeate side pressure is 780 kPa. The evaluation result is such that the $CO_2$ permeance is $2.26 \times 10^{-5}$ (mol/($m^2 \cdot s \cdot kPa$)); the $CO_2/H_2$ selectivity is 282; and the steam permeance is $1.98 \times 10^{-4}$ (mol/($m^2 \cdot s \cdot kPa$)), so that it is shown that this membrane structure has a high separation performance.

Next, an example of the second separation membrane 34 having a cylindrical structure of inner surface type will be described. The construction of the second separation membrane 34 is such that a layer of a PVA/PAA copolymer salt that does not contain a $CO_2$ carrier is formed as a separation function layer 91 in the inside of a porous support 92 having a cylindrical shape and a thickness of 0.5 mm. The condition for evaluating the membrane performance is as follows. The temperature is 150° C.; the composition ratio of the second mixture gas is $CO_2$: 5% and $H_2O$: 95%; the flow rate of the second mixture gas is $6.55 \times 10^{-3}$ mol/min; the supply side pressure is 300 kPa; and the permeate side pressure is atmospheric pressure. The evaluation result is such that the steam permeance is $6.99 \times 10^{-4}$ (mol/($m^2 \cdot s \cdot kPa$)) and the steam/$CO_2$ selectivity is 1085, so that it is shown that this membrane structure has a high separation performance.

(9) Next, advantages of the construction in which the steam that has permeated through the second separation membrane 34 is supplied to the permeate side of the first separation membrane 33, which has been exemplified in the above (4) and FIG. 15, will be described. The advantages include a first advantage that the $CO_2$ partial pressure difference in the $CO_2$ separation membrane can be ensured and a second advantage that decrease in the relative humidity on the supply side in the $CO_2$ separation membrane can be restrained.

First, the first advantage (ensuring the $CO_2$ partial pressure difference) will be described in detail. Since the driving force by which the gas permeates through the separation membrane is a partial pressure difference, the gas will not permeate when there is no partial pressure difference between the supply side and the permeate side. In the case of separating the mixture gas without using a sweep gas, along the flow direction of the supplied gas, the supply side partial pressure of the gas that permeates selectively in the mixture gas will decrease and, conversely, the permeate side partial pressure will increase. Therefore, along the flow direction of the supplied gas, the partial pressure difference between the supply side and the permeate side will decrease, and the amount of permeation will decrease. On the other hand, with regard to the gas that does not permeate easily in the mixture gas, along the flow direction of the supplied gas, the supply side partial pressure will increase, and the partial pressure difference will increase, so that the amount of permeation will increase.

According as the recovery ratio of the gas that is allowed to permeate selectively is set to be higher, the needed membrane area will increase. Therefore, by considering together with the above-described result, according as the recovery ratio of the gas that is allowed to permeate selectively is set to be higher, the purity in the permeated gas will decrease.

Here, by allowing a sweep gas to flow to the permeate side, the partial pressure of the permeate gas on the permeate side can be decreased, so that a permeate gas having a higher recovery ratio and a higher purity can be obtained with the same membrane area than in the case in which the sweep gas is not allowed to flow. Also, when the same recovery ratio is set, the needed membrane area will decrease, and a gas having a high purity can be obtained.

As the sweep gas, an inert gas such as Ar can be used if the purpose is simply to remove $CO_2$ in the supplied gas; however, when it is desired that $CO_2$ in the gas that has permeated through the $CO_2$ selective permeation membrane is utilized, there will be a need to separate Ar and $CO_2$ when a gas such as Ar is used as a sweep gas, so that the gas cannot be practically used. On the other hand, when steam is used as the sweep gas, the steam alone can be easily removed by liquefying the steam by cooling. Therefore, by allowing the steam that has permeated through the second separation membrane (steam selective permeation membrane) to flow to the permeate side of the first separation membrane ($CO_2$ selective permeation membrane) as a sweep gas, the above-described advantage can be obtained as compared with a case in which the first separation membrane is used alone.

A similar statement can be made on a case in which a separation membrane based on a dissolution and diffusion mechanism that separates a gas in accordance with the difference in solubility of the gas in the membrane material and in diffusion rate of the gas within the membrane is used as the first separation membrane instead of the facilitated transport membrane.

The purity and the recovery ratio are as follows. Assuming that the components in a dry gas that has permeated through the membrane are, for example, A and B, and that the concentrations of A and B are a (%) and b (%), respectively, a is the purity (%) of A. Also, assuming that the supplied flow rate of A is x (mol/min) and the permeated flow rate is y (mol/min), $(y/x) \times 100$ is the recovery ratio (%) of A.

A result of calculation by simulation and comparison of the purity of $CO_2$ and the needed membrane area when the $CO_2$ recovery ratio is set to be 90% in a case in which $CO_2$ is separated by a $CO_2$ selective permeation membrane alone without allowing a sweep gas to flow and in a case in which a $CO_2$ selective permeation membrane and a steam selective permeation membrane are combined and $CO_2$ is separated by allowing the steam that has permeated through the steam selective permeation membrane to flow to the permeate side of the $CO_2$ selective permeation membrane is shown below.

In the case of using the $CO_2$ selective permeation membrane alone, the following values were used by considering the result of the example of the first separation membrane 33 having a cylindrical structure of inner surface type described in the above (8).

Flow rate of first mixture gas: 1 (mol/s)
Composition of first mixture gas: $CO_2$: 19%, $H_2$: 19%, $H_2O$: 62%
Supply side pressure: 800 kPa
Permeate side pressure: 300 kPa
$CO_2$ permeance: $2.26 \times 10^{-5}$ (mol/($m^2 \cdot s \cdot kPa$))
$CO_2/H_2$ selectivity: 282
Steam permeance: $1.98 \times 10^{-4}$ (mol/($m^2 \cdot s \cdot kPa$))

The values of the operation condition and the permeation performance used in relation to the $CO_2$ selective permeation membrane in the case in which a $CO_2$ selective permeation membrane and a steam selective permeation membrane are combined and the steam that has permeated through the steam selective permeation membrane is supplied to the permeate side of the $CO_2$ selective permeation membrane were set to be the same as the values of the above $CO_2$ selective permeation membrane alone. Regarding the operation condition and the permeation performance of the steam selective permeation membrane, the following values were used by considering the result of the example of the second separation membrane 34 having a cylindrical structure of inner surface type described in the above (8).

Supply side pressure of steam selective permeation membrane: 300 kPa
Permeate side pressure of steam selective permeation membrane: atmospheric pressure
Steam permeance: $6.99 \times 10^{-4}$ (mol/($m^2 \cdot s \cdot kPa$))
Steam/$CO_2$ selectivity: 1085

As a result of carrying out the simulation under the above condition, while the purity of $CO_2$ was 89% in the case of the $CO_2$ selective permeation membrane alone, the purity of $CO_2$ was 99% in the case of the combination of the $CO_2$ selective permeation membrane and the steam selective permeation membrane. Also, the needed membrane area in the case of the $CO_2$ selective permeation membrane alone was seven times as large as that in the case of the combination of the $CO_2$ selective permeation membrane and the steam selective permeation membrane. Here, the needed membrane area in the case of the combination of the $CO_2$ selective permeation membrane and the steam selective permeation membrane was calculated as a sum of the membrane areas of the $CO_2$ selective permeation membrane and the steam selective permeation membrane.

Next, the above-described second advantage (restraint of decrease in the relative humidity on the supply side) will be described in detail. The $CO_2$ permeation performance in the $CO_2$ facilitated transport membrane is affected by the relative humidity of the supply side gas. This is due to the following reason. In the $CO_2$ facilitated transport membrane, water is involved in the reaction of $CO_2$ with the $CO_2$ carrier in the membrane. Therefore, according as the moisture content in the membrane is higher, the permeation rate of $CO_2$ will be higher and, according as the relative humidity of the supply side gas is higher, the moisture content in the membrane will be larger.

Generally, in the $CO_2$ facilitated transport membrane, steam also permeates through the membrane at a rate equivalent to or higher than that of $CO_2$. Therefore, along the flow direction of the permeate side gas, the steam partial pressure decreases, and also the relative humidity decreases along the flow direction of the permeate side gas. This results in a defect such that the permeation rate of $CO_2$ decreases along the flow direction of the permeate side gas. Here, by supplying the steam that has permeated through the second separation membrane to the permeate side of the first separation membrane, the steam partial pressure on the permeate side of the first separation membrane will be higher, so that the difference between the steam partial pressure on the supply side and the steam partial pressure on the permeate side will be small. As a result thereof, the permeation amount of steam through the first separation membrane will decrease, and the decrease in the steam partial pressure on the supply side of the first separation membrane will be restrained, whereby the decrease in the relative humidity on the supply side of the first separation membrane will be restrained.

Here, when the flow rate of the supplied gas is extremely large relative to the membrane area, the steam partial pressure of the supplied gas decreases little from its inlet to the outlet, so that the relative humidity does not decrease. However, when practical use is considered, the recovery ratio is required, so that it is hardly conceivable that the steam partial pressure decreases little at the entrance and at the exit of the supplied gas without allowing a sweep gas to flow on the permeate side.

Next, an evaluation result on the second advantage will be described. The evaluation was carried out on two cases, namely, the case in which steam is supplied as a sweep gas and the case in which it is not supplied, with respect to a $CO_2$ facilitated transport membrane in which a layer of a PVA/PAA copolymer salt containing cesium carbonate which is a $CO_2$ carrier is formed as a separation function layer in the inside of a porous support having a cylindrical shape and a thickness of 1.5 mm. Here, the membrane area is 24.0 cm². Also, the following values were used as the evaluation condition.

Flow rate of first mixture gas: $5.89 \times 10^{-3}$ mol/min
Composition of first mixture gas: $CO_2$: 7%, $H_2$: 46%, $H_2O$: 47%
Supply side pressure: 400 kPa
Permeate side pressure: atmospheric pressure The evaluation results are as follows. From the following evaluation results, it will be understood that, when steam (sweep gas) is supplied to the permeate side of the $CO_2$ facilitated transport membrane, the degree of decrease in the relative humidity is small and, as a result thereof, the permeation rate of $CO_2$ is high as compared with the case in which steam (sweep gas) is not supplied to the permeate side.

1) With the Supply of Steam (Sweep Gas):
$CO_2$ permeance: $1.75 \times 10^{-5}$ (mol/(m²·s·kPa))
$CO_2/H_2$ selectivity: 563
Entrance relative humidity on the supply side: 70%
Exit relative humidity on the supply side: 52%
2) Without the Supply of Steam (Sweep Gas):
$CO_2$ permeance: $1.18 \times 10^{-5}$ (mol/(m²·s·kPa))
$CO_2/H_2$ selectivity: 545
Entrance relative humidity on the supply side: 70%
Exit relative humidity on the supply side: 29%

(10) In the above-described embodiment, it has been assumed that the first mixture gas supplied to the first separation membrane ($CO_2$ selective permeation membrane) has a temperature of 100° C. or higher in the case of being produced as a result of the $CO_2$ shift treatment. However, as exemplified in FIGS. 14 and 15, in the case of re-utilizing the steam that has permeated through the second separation membrane (steam selective permeation membrane), the steam can be re-utilized because the steam is in a gaseous state as long as the steam partial pressure is a pressure below or equal to the saturation water vapor pressure at a temperature of 100° C. or lower (here, the total pressure is reduced to a pressure below atmospheric pressure by a pump or the like) even if the steam has a temperature below 100° C.

Hereafter, an example will be shown in which the first separation membrane functions as a $CO_2$ selective permeation membrane even if the first mixture gas has a temperature below or equal to 100° C. The construction of the first separation membrane is such that a layer of a PVA/PAA copolymer salt containing glycine which is a $CO_2$ carrier and cesium hydroxide which is a deprotonating agent of glycine is formed as a separation function layer in the inside of a porous support having a cylindrical shape and a thickness of 0.5 mm. The condition for evaluating the membrane performance is as follows. The temperature is 80° C.; the composition ratio of the first mixture gas is $CO_2$: 8%, $H_2$: 73%, and $H_2O$: 19%; the flow rate of the first mixture gas is $4.03 \times 10^{-2}$ mol/min; the supply side pressure is 200 kPa; and the permeate side pressure is atmospheric pressure. The evaluation result is such that the $CO_2$ permeance is $9.71 \times 10^{-5}$ (mol/(m²·s·kPa)) and the $CO_2/H_2$ selectivity is 196, so that it is shown that the $CO_2$ selective permeation membrane has a high separation performance even at a temperature below 100° C.

EXPLANATION OF REFERENCES

1: hydrogen production apparatus
1a, 1b: gas separation apparatus
11: PVA/PAA salt copolymer gel membrane
12: hydrophilic porous membrane
13, 14: hydrophobic porous membrane
20: membrane reactor of the present invention
30: membrane reactor
31: water vapor reformer
32: CO shift treatment section (first treatment section)
33: $CO_2$ facilitated transport membrane, first separation membrane
34: second separation membrane
36: second treatment section
38: circulation means
40: space
41: gel membrane
42: support membrane made of ceramics
43, 47, 48: space
50: sample
51: flow type gas permeation cell
52: feed side chamber
53: permeate side chamber
54: cooling trap
55: back pressure regulator
56: cooling trap
57: gas chromatograph
58: metering liquid-feeding pump
60: space
61: gel membrane
62: support membrane made of ceramics
63: space
64: pipe line
71: mixture gas supply source
72: first treatment section
73: space
74: pipe line
75: second treatment section
76: space
80: pipe line
81: vapor utilization mechanism
82: third treatment section
83: third separation membrane

The invention claimed is:
1. A gas separation apparatus that separates carbon dioxide and water vapor individually from a first mixture gas containing at least carbon dioxide, hydrogen and water vapor, the gas separation apparatus comprising a first separation membrane having a $CO_2/H_2$ selective separation performance and a second separation membrane having a $H_2O/CO_2$ selective separation performance, the first and second membranes being made of different materials, wherein:
the first separation membrane is arranged to separate a second mixture gas containing carbon dioxide and water vapor from the first mixture gas by allowing carbon dioxide and water vapor contained in the first mixture gas to permeate selectively over hydrogen when the first mixture gas is supplied, and the second separation membrane is arranged to separate water vapor from the second mixture gas by allowing water vapor contained in the second mixture gas to permeate selectively over carbon dioxide when the second mixture gas is supplied.

2. The gas separation apparatus according to claim 1, wherein, when the first mixture gas is supplied at 100° C. or higher, the first separation membrane separates the second mixture gas containing carbon dioxide and water vapor from the first mixture gas by allowing carbon dioxide and water vapor contained in the first mixture gas to permeate selectively.

3. The gas separation apparatus according to claim 1 or 2, wherein the water vapor that has permeated through the second separation membrane is re-utilized by being supplied to a stage before the second separation membrane.

4. The gas separation apparatus according to claim 3, wherein water vapor that has permeated through the second separation membrane is supplied to a stage after the first separation membrane as a sweep gas for the first separation membrane.

5. A membrane reactor that carries out a CO shift treatment on a gas to be shifted containing carbon monoxide and water vapor, comprising:
a first treatment section having a first separation membrane formed on at least a part of an outer circumferential surface of an occupied space thereof, an inside of the first treatment section being filled with a CO shift catalyst, the first separation membrane having a $CO_2/H_2$ selective separation performance; and
a second treatment section having a second separation membrane formed on at least a part of an outer circumferential surface of an occupied space thereof, the second separation membrane having a $H_2O/CO_2$ selective separation performance and being made of a material different from that of the first separation membrane, wherein
the first treatment section produces a first mixture gas containing hydrogen, carbon dioxide, and water vapor by performing a shift treatment on the gas to be shifted with use of the CO shift catalyst under a temperature condition of 100° C. or higher, and allows carbon dioxide and water vapor contained in the first mixture gas to permeate through the first separation membrane selectively over hydrogen, and
the second treatment section receives supply of a second mixture gas containing carbon dioxide and water vapor that have permeated through the first separation membrane, and allows water vapor contained in the second mixture gas to permeate through the second separation membrane selectively over carbon dioxide.

6. The membrane reactor according to claim 5, wherein the first treatment section and the second treatment section are placed in an identical box body.

7. The membrane reactor according to claim 6, wherein the first treatment section and the second treatment section are formed to have coaxial cylindrical shapes.

8. The membrane reactor according to any one of claims 5 to 7, wherein the first separation membrane provided in the first treatment section is a $CO_2$ facilitated transport membrane having a $CO_2/H_2$ selective separation performance under a temperature condition of 100° C. or higher, and is made such that a gel layer is carried on a hydrophilic porous membrane having a heat resistance of 100° C. or higher, the gel layer including an additive made of cesium carbonate, cesium bicarbonate or cesium hydroxide within a hydrogel membrane.

9. The membrane reactor according to any one of claims 5 to 7, wherein the first separation membrane provided in the first treatment section is a $CO_2$ facilitated transport membrane having a $CO_2/H_2$ selective separation performance under a temperature condition of 100° C. or higher, and is made such that a gel layer is carried on a hydrophilic porous membrane having a heat resistance of 100° C. or higher, the gel layer including an additive made of rubidium carbonate, rubidium bicarbonate or rubidium hydroxide within a hydrogel membrane.

10. A hydrogen production apparatus comprising:
the membrane reactor according to any one of claims 5 to 7, and
a reformer whose inside is filled with a reforming catalyst, wherein
an object gas containing hydrogen as a major component that does not permeate through the first separation membrane within the first treatment section is outputted from the first treatment section,
the reformer is constructed to receive supply of a gas to be reformed containing hydrocarbon and water vapor, to produce the gas to be shifted by performing a reforming treatment on the gas to be reformed with use of the reforming catalyst, and to output the gas to be shifted to the first treatment section, and
water vapor that has permeated through the second separation membrane in the second treatment section flows into the reformer or at least one of an upstream side and a downstream side of the first separation membrane of the first treatment section.

11. The hydrogen production apparatus according to claim 10, further comprising a third treatment section having a third separation membrane having a material identical to that of the second separation membrane, wherein
the third treatment section is constructed to separate water vapor from the first mixture gas by allowing water vapor contained in a residual gas of the first mixture gas that has not permeated through the first separation membrane in the first treatment section to permeate selectively, and
water vapor that has permeated through the third separation membrane in the third treatment section flows into the reformer or at least one of the upstream side and the downstream side of the first separation membrane of the first treatment section.

12. A gas separation method that separates carbon dioxide and water vapor individually from a first mixture gas containing at least carbon dioxide, hydrogen and water vapor, comprising:
supplying the first mixture gas to be brought into contact with a surface of a first separation membrane having a $CO_2/H_2$ selective separation performance so as to separate a second mixture gas containing carbon dioxide and water vapor from the first mixture gas by allowing carbon dioxide and water vapor contained in the first mixture gas to permeate through the first separation membrane selectively over hydrogen; and
supplying the second mixture gas to be brought into contact with a surface of a second separation membrane having a $H_2O/CO_2$ selective separation performance and made of a material different from that of the first separation membrane so as to separate water vapor from the second mixture gas by allowing water vapor contained in the second mixture gas to permeate through the second separation membrane selectively over carbon dioxide.

13. The gas separation method according to claim 12, comprising supplying the first mixture gas to be brought into contact with the surface of the first separation membrane at a temperature of 100° C. or higher so as to separate the second mixture gas containing carbon dioxide and water vapor from the first mixture gas by allowing carbon dioxide and water vapor contained in the first mixture gas to permeate selectively through the first separation membrane.

14. A hydrogen production method comprising:
   a reforming step of receiving supply of a gas to be reformed containing hydrocarbon and water vapor and producing a gas to be shifted containing carbon monoxide, hydrogen, and water vapor by performing a reforming treatment on the gas to be reformed with use of a reforming catalyst;
   a shifting step of receiving supply of the gas to be shifted and producing a first mixture gas containing hydrogen, carbon dioxide, and water vapor by performing a CO shift treatment on the gas to be shifted with use of a shift catalyst under a temperature condition of 100° C. or higher;
   a first separation step of supplying the first mixture gas to be brought into contact with a surface of a first separation membrane having a $CO_2/H_2$ selective separation performance so as to separate a second mixture gas containing carbon dioxide and water vapor that permeate through the first separation membrane from the first mixture gas by allowing carbon dioxide and water vapor contained in the first mixture gas to permeate through the first separation membrane selectively over hydrogen and to recover an object gas containing hydrogen that does not permeate through the first separation membrane as a major component; and
   a second separation step of supplying the second mixture gas to be brought into contact with a surface of a second separation membrane having a $H_2O/CO_2$ selective separation performance and made of a material different from that of the first separation membrane so as to separate water vapor that permeates through the second separation membrane from the second mixture gas by allowing water vapor contained in the second mixture gas to permeate through the second separation membrane selectively over carbon dioxide, wherein
   the shifting step and the first separation step are carried out in parallel within an identical treatment mechanism, and
   at least part of water vapor recovered in the second separation step is utilized for reaction in the shifting step.

* * * * *